United States Patent
Zhang et al.

(10) Patent No.: US 12,035,174 B2
(45) Date of Patent: Jul. 9, 2024

(54) RATE CONTROL METHOD, APPARATUS, AND SYSTEM

(71) Applicant: HUAWEI TECHNOLOGIES CO., LTD., Guangdong (CN)

(72) Inventors: Chengchen Zhang, Shanghai (CN); Lin Shu, Shanghai (CN); Wenqiang Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/117,828

(22) Filed: Dec. 10, 2020

(65) Prior Publication Data

US 2021/0099912 A1    Apr. 1, 2021

Related U.S. Application Data

(63) Continuation of application No. PCT/CN2019/098644, filed on Jul. 31, 2019.

(30) Foreign Application Priority Data

Aug. 25, 2018   (CN) .......................... 201810976506.4

(51) Int. Cl.
  *H04W 28/10*    (2009.01)
  *H04W 76/10*    (2018.01)
  (Continued)

(52) U.S. Cl.
  CPC ........... *H04W 28/10* (2013.01); *H04W 76/10* (2018.02); *G16Y 30/00* (2020.01); *H04W 84/042* (2013.01)

(58) Field of Classification Search
  CPC ....... H04W 4/70; H04W 28/02; H04W 28/10; H04W 60/04; H04W 76/18; H04W 80/10;
  (Continued)

(56) References Cited

U.S. PATENT DOCUMENTS

2005/0111361 A1* 5/2005 Hosein ................. H04L 47/263
                                                                370/412
2018/0212710 A1   7/2018 Nneke et al.
(Continued)

FOREIGN PATENT DOCUMENTS

CN    106648904 A    5/2017
CN    107925631 A    4/2018
(Continued)

OTHER PUBLICATIONS

Office Action issued in Japanese Application No. 2020-572781 dated Feb. 14, 2022, 7 pages (with English translation).
(Continued)

*Primary Examiner* — Joseph E Avellino
*Assistant Examiner* — Mon Cheri S Davenport
(74) *Attorney, Agent, or Firm* — Fish & Richardson P.C.

(57) ABSTRACT

Methods, systems, and apparatus for rate control are provided. In one aspect, a rate control method includes: receiving, by a control device, a connection establishment request from a terminal, the connection establishment request being for establishing a connection for the terminal to transmit data, and sending, by the control device, rate control time management information to a data sending device. The data sending device is configured to perform rate control over the data sent through the connection based on the time management information. The ratio control time management information includes start time indication information of a rate control time unit used for rate control, and the start time indication information indicates a start time of the rate control time unit.

20 Claims, 10 Drawing Sheets

(51) Int. Cl.
*G16Y 30/00* (2020.01)
*H04W 84/04* (2009.01)

(58) Field of Classification Search
CPC .............. H04W 28/0289; H04W 8/08; H04W 28/0838; H04W 28/0908; H04W 48/06; H04W 76/10; H04W 76/12; H04W 84/042; H04W 28/22; H04W 76/11; H04W 76/20; H04W 28/0273; H04L 1/0002; H04L 1/0015; H04M 15/00
See application file for complete search history.

(56) References Cited

U.S. PATENT DOCUMENTS

| | | | |
|---|---|---|---|
| 2019/0007329 A1* | 1/2019 | Velev ................... | H04L 47/263 |
| 2019/0116631 A1* | 4/2019 | Talebi Fard .......... | H04W 76/11 |
| 2020/0028973 A1* | 1/2020 | Livanos ............ | H04M 15/8214 |

FOREIGN PATENT DOCUMENTS

| | | |
|---|---|---|
| KR | 20160131413 A | 11/2016 |
| WO | 2017141750 A1 | 8/2017 |
| WO | 2018008977 A1 | 1/2018 |
| WO | 2018063462 A1 | 4/2018 |
| WO | 2018084115 A1 | 5/2018 |

OTHER PUBLICATIONS

3GPP TS 24.301 V15.3.0 (Jun. 2018), "3rd Generation Partnership Project; Technical Specification Group Core Network and Terminals; Non-Access-Stratum (NAS) protocol for Evolved Packet System (EPS); Stage 3," Jun. 2018, 527 pages.
3GPP TS 23.401 V15.4.0 (Jun. 2018), "3rd Generation Partnership Project; Technical Specification Group Services and System Aspects; General Packet Radio Service (GPRS) enhancements for Evolved Universal Terrestrial Radio Access Network (E-UTRAN) access," Jun. 2018, 410 pages.
3GPP TR 23.724 V0.3.0 (Apr. 2018), "3rd Generation Partnership Project; Technical Specification Group Services and System Aspects; Study on Cellular IoT support and evolution for the 5G System(Release 16)," Apr. 2018, 157 pages.
3GPP TS 29.274 V15.4.0 (Jun. 2018), "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3," Jun. 2018, 378 pages.
Extended European Search Report issued in European Application No. 19854148.4 dated Sep. 1, 2021, 9 pages.
PCT International Search Report and Written Opinion issued in International Application No. PCT/CN2019/098644 dated Oct. 22, 2019, 13 pages (with English translation).
Office Action issued in Indian Application No. 202047052059 dated Dec. 10, 2021, 6 pages.
Office Action issued in Korean Application No. 2020-7036303 dated May 20, 2022, 10 pages (with English translation).
Office Action issued in Chinese Application No. 201810976506.4 dated Nov. 2, 2022, 7 pages.

* cited by examiner

RATE CONTROL METHOD, APPARATUS, AND SYSTEM

CROSS-REFERENCE TO RELATED APPLICATIONS

This application is a continuation of International Application No. PCT/CN2019/098644, filed on Jul. 31, 2019, which claims priority to Chinese Patent Application No. 201810976506.4, filed on Aug. 25, 2018. The disclosures of the aforementioned applications are hereby incorporated by reference in their entireties.

TECHNICAL FIELD

This application relates to the field of communications technologies, and in particular, to a rate control method, apparatus and system.

BACKGROUND

Cellular internet of things (CIOT) is an internet of things that allows a CIOT terminal to access a mobile communications network based on narrowband internet of things (NB-IoT) access technology or an enhanced machine type communication eMTC) access technology. CIOT is a cellular network that supports an internet of things device with low-complexity and a low-throughput. As internet of things technologies develop and popularize, increasingly more user equipment (UE) access CIOT. Massive CIOT UEs require a large amount of uplink and downlink data traffic when sending and receiving data. This greatly affects a management network element entity in a core network and a radio bearer in a radio access network. To resolve this problem, the 3rd generation partnership project (3GPP) defines two rate control mechanisms: serving public land mobile network (Serving PLMN) rate control and access point name (APN) rate control.

The serving PLMN rate control is used by a serving PLMN to limit a quantity of packet data units (PDU) in user data transmitted by UE by using a non-access stratum (NAS) message, and the APN rate control is used by a home public land mobile network (HPLMN) operator to limit an amount of uplink user data sent by the UE. Both of the rate control methods can effectively reduce load pressure caused by massive connections. In the two rate control methods, a data sender sends a proper quantity of data PDUs at a time interval provided in rate control information. However, a data receiver may discard a data PDU or delay sending a data PDU. This increases a packet loss rate and a transmission delay during user data transmission, and affects a service feature and user experience.

SUMMARY

Embodiments of this application provide a rate control method, apparatus, and system, to resolve a prior-art problem that a packet is still discarded or delayed being processed when a data sending device sends a proper amount of data based on rate control information.

To achieve the foregoing objective, the embodiments of this application provide the following technical solutions.

According to a first aspect, a rate control method is provided. The method includes: A control device receives a connection establishment request from a terminal, where the connection establishment request is used to establish a connection for the terminal to transmit data. The control device sends rate control time management information to a data sending device, where the time management information is used by the data sending device to perform rate control over the data sent through the connection, the time management information includes start time indication information of a rate control time unit used for rate control, and the start time indication information is used to indicate a start time of the rate control time unit.

According to a second aspect, a rate control method is provided. The method includes: A data sending device receives rate control time management information, where the time management information includes start time indication information of a rate control time unit used for rate control on a connection through which a terminal transmits data, and the start time indication information is used to indicate a start time of the rate control time unit. The data sending device performs, based on the rate time management information, rate control over the data sent through the connection.

Based on the rate control method provided in the first aspect or the second aspect of the embodiments of this application, after receiving the time management information including the start time indication information, the data sending device can determine a same time point for starting rate control timing as the control device. In this way, when the data sending device sends a proper quantity of data units to the control device based on the time management information, the control device considers the data as valid data, and does not discard or delay processing the data.

In a possible design of the first aspect or the second aspect, the start time indication information may be specifically a time point at which the connection is successfully established, a time point at which the first data unit is transmitted through the connection, or a start time of a next charging period.

In a possible design of the first aspect or the second aspect, if the rate control is serving public land mobile network rate control, the control device may be a mobility management network element or a session management network element, and the data sending device is the terminal.

In a possible design, if the rate control is serving public land mobile network rate control, the control device is a mobility management network element or a session management network element, and the data sending device is a user plane network element; or the control device is a mobility management network element, and the data sending device is a session management network element.

In a possible design of the first aspect or the second aspect, if the rate control is data network name rate control, the control device is a user plane network element, and the data sending device is the terminal.

In a possible design of the first aspect or the second aspect, if the rate control is access point name rate control, the control device is a user plane network element, and the data sending device is the terminal.

In a possible design of the first aspect or the second aspect, if the data sending device is the terminal, the time management information further includes timing indication information, and the timing indication information is specifically as follows: When the terminal enters a connected mode, timing continues based on a remaining value of the rate control time unit; when the terminal enters a connected mode, timing restarts based on the rate control time unit; or timing starts when the first data unit is transmitted in a next rate control time unit after the rate control time unit expires.

In a possible design of the first aspect or the second aspect, if the data sending device is the session management network element or the user plane network element, the time management information further includes timing indication information. The timing indication information is specifically as follows: Timing is continuously performed after the start time of the rate control time unit; or timing starts when the first data unit is transmitted in a next rate control time unit after the rate control time unit expires.

In a possible design of the first aspect or the second aspect, the time management information further includes a rate control value. The rate control value is used to indicate a maximum quantity of data units sent by the data sending device in the rate control time unit.

In a possible design of the first aspect or the second aspect, the time management information further includes information about the rate control time unit.

According to a third aspect, an embodiment of this application provides a rate control apparatus. The apparatus has a function of implementing the method according to any one of the first aspect or the possible designs of the first aspect. The function may be implemented by hardware, or may be implemented by hardware executing corresponding software. The hardware or the software includes one or more modules corresponding to the function.

According to a fourth aspect, an embodiment of this application provides a data sending apparatus. The apparatus has a function of implementing the method according to any one of the second aspect or the possible designs of the second aspect. The function may be implemented by hardware, or may be implemented by hardware executing corresponding software. The hardware or the software includes one or more modules corresponding to the function.

According to a fifth aspect, an embodiment of this application provides a rate control apparatus, including a processor and a memory. The memory is configured to store a computer-executable instruction. When the rate control apparatus runs, the processor executes the computer-executable instruction stored in the memory, to enable the rate control apparatus to perform the rate control method according to any one of the first aspect or the possible designs of the first aspect.

According to a sixth aspect, an embodiment of this application provides a rate control apparatus, including a processor. The processor is configured to: be coupled to a memory; and after reading an instruction stored in the memory, perform, according to the instruction, the rate control method according to any one of the first aspect or the possible designs of the first aspect.

According to a seventh aspect, an embodiment of this application provides a data sending apparatus, including a processor and a memory. The memory is configured to store a computer-executable instruction. When the data sending apparatus runs, the processor executes the computer-executable instruction stored in the memory, to enable the data sending apparatus to perform the rate control method according any one of the second aspect or the possible designs of the second aspect.

According to an eighth aspect, an embodiment of this application provides a data sending apparatus, including a processor. The processor is configured to: be coupled to a memory; and after reading an instruction stored in the memory, perform, according to the instruction, the rate control method according to any one of the second aspect or the possible designs of the second aspect.

According to a ninth aspect, an embodiment of this application provides a rate control system, including the rate control apparatus according to the third aspect and the data sending apparatus according to the fourth aspect, or including the rate control apparatus according to the fifth aspect or the sixth aspect and the data sending apparatus according to the seventh aspect or the eighth aspect.

According to a tenth aspect, an embodiment of this application provides a computer program product including an instruction. When the computer program product runs on a computer, the computer is enabled to perform the method according to either of the first aspect or the second aspect.

According to an eleventh aspect, an embodiment of this application provides a computer-readable storage medium, including an instruction. When the instruction is run on a computer, the computer is enabled to perform the method according to either of the first aspect or the second aspect.

These aspects or other aspects in this application may be clearer and more intelligible in descriptions in the following embodiments.

DESCRIPTION OF EMBODIMENTS

Figure 1:
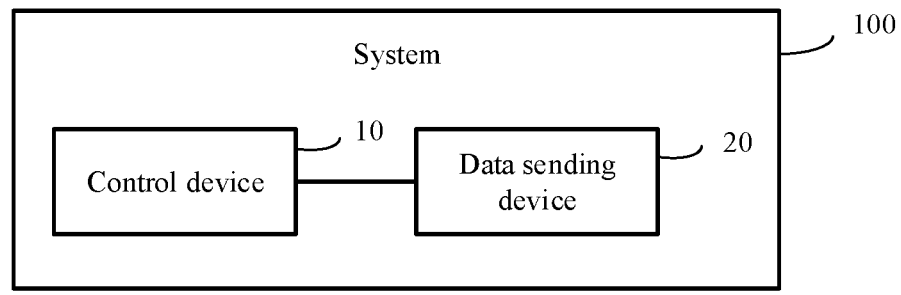
FIG. 1 is a schematic diagram of a possible system network according to an embodiment of this application.

To make the objectives, technical solutions, and advantages of this application clearer, the following further describes this application in detail with reference to the accompanying drawings. A specific operation method in method embodiments may also be applied to an apparatus embodiment or a system embodiment.

In descriptions of this application, "I" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two unless otherwise specified. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and that the terms such as "first" and "second" do not indicate a definite difference.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Before the embodiments of this application are described, serving PLMN rate control, APN rate control, and data network name (DNN) rate control are first briefly described. The serving PLMN rate control is used by a serving PLMN to limit a quantity of uplink and downlink PDUs transmitted by using NAS messages. A PDU transmitted by using a NAS message is also referred to as a NAS data PDU. The NAS data PDU is a type of user data transmitted by using a control plane NAS message (NAS messages with user data over control plane). Alternatively, it may be understood that the serving PLMN rate control is used to limit a quantity of uplink and downlink NAS messages that carry user data. Uplink rate control is used to limit a quantity of NAS data PDUs sent by UE. Downlink rate control is used to limit a quantity of NAS data PDUs sent by a user plane network element or a session management network element. The uplink rate control and the downlink rate control may have different limitations on the NAS data PDUs. Serving PLMN rate control information is configured by an operator on a management network element or entity on a core network. Generally, the serving PLMN rate control information is set as "X NAS data PDUs every six minutes", where X is an integer and should be greater than or equal to 10. The NAS data PDU herein may be understood as a NAS message used to transmit user data. For example, for an evolved packet system (EPS), in a packet data network (PDN) connection establishment process, a management network element may send local serving PLMN rate control information to UE, a PDN gateway (PGW), or a service capability exposure network element (Service Capability Exposure Function, SCEF). For a 5th generation (5G) system, a management network element may send local serving PLMN rate control information to UE, a session management function (SMF), a user plane function (UPF), or a network exposure function (NEF).

The APN rate control is used by a home operator to limit a quantity of uplink user data PDUs sent by UE to a given APN. The limited uplink user data PDUs may be user data transmitted by using a control plane NAS message, or may be user data transmitted via a user plane. APN rate control information is configured by the operator on a user plane network element or entity on a core network. Generally, the APN rate control information is set as a maximum quantity of user data messages sent by UE in a specified time unit, for example, "X user data messages per day", where X is an integer having no minimum value limitation. The user data message herein may be understood as a data unit or a data packet. The time unit herein is also referred to as a time unit, a time interval, or the like. UE that supports the APN rate control may also support a limitation on a quantity of exception report data packets. To be specific, the UE may continue to send a specific quantity of exception report data packets after the UE sends an allowed maximum quantity of pieces of information, that is, Y pieces of information per day. For an EPS, the APN rate control information is configured on a PGW or an SCEF. Generally, the APN rate control information includes three types of information: a quantity of data packets (namely, data units) that can be sent per time unit; whether UE is allowed to continue to send an exception report after the quantity of data packets reaches a limit value; and a quantity of exception report packets if the UE is allowed to send the exception report after the quantity of data packets reaches the limit value. The DNN rate control is similar to the APN rate control, and is not described herein. Generally, the APN rate control is applied to an EPS, and the DNN rate control is applied to a 5GS.

In a serving PLMN rate control method, an APN rate control method, and a DNN rate control method, rate control information is based on a time interval. It may be understood that the delivered rate control information is valid within the time interval, and is invalid beyond the time interval. In a research process, the inventor finds that in the three rate control methods, a start time of the time interval is not coordinated between a control device and a data sending device, and consequently, time for performing rate control by the control device is not synchronized with time for performing rate control by the data sending device. For example, serving PLMN rate control information is "20 NAS data PDUs every six minutes". The data sending device considers that the time interval starts when data is sent for the first time. For example, the data is sent at 10:02 for the first time. However, the control device considers that the time interval starts when a PDN connection is established. For example, the PDN connection is established at 10:00. In this way, the control device considers that 20 pieces of data can be received within six minutes of [10:00, 10:06), and 20 pieces of data can be received within six minutes of [10:06, 10:12). The data sending device considers that 20 pieces of data can be sent within [10:02, 10:08), and 20 pieces of data can be sent within [10:08, 10:14).

It is assumed that the data sending device sends 15 pieces of data within four minutes of [10:02, 10:06), sends five pieces of data within two minutes of [10:06, 10:08), and sends 16 pieces of data within four minutes of [10:08,10:12). In this way, the data sending device sends data strictly based on the serving PLMN rate control information, and the data does not exceed a rate control limit. However, the control device receives 5+16 pieces of data, that is, 21 pieces of data, within [10:06, 10:12). This exceeds an upper limit specified in the serving PLMN rate control information that a maximum of 20 pieces of data can only be received within [10:06, 10:11]. As a result, the control device discards the $21^{st}$ pieces of data. In other words, in the prior art, because the data sending device and the control device do not coordinate the start time of the time interval, the time for performing rate control by the data sending device is not synchronized with the time for performing rate control by the control device. This also increases a packet loss rate and a transmission delay during data (for example, user data) transmission, and affects a service feature and user experience.

To resolve the foregoing problems, embodiments of this application provide a rate control method and system. The following describes a rate control system and method provided in the embodiments of this application one by one.

As shown in FIG. 1, an embodiment of this application provides a rate control system 100. The system 100 includes a control device 10 and a data sending device 20. The system 100 may be configured to perform a rate control method provided in this application.

The control device 10 is configured to: receive a connection establishment request from a terminal, where the connection establishment request is used to establish a connection for the terminal to transmit data; and send rate control time management information to the data sending device 20, where the time management information is used by the data sending device 20 to perform rate control over the data sent through the connection. The time management information includes start time indication information of a rate control time unit used for rate control, and the start time indication information is used to indicate a start time of the rate control time unit.

The data sending device 20 is configured to receive the time management information. Optionally, the data sending device 20 performs, based on the time management information, rate control over the data sent through the connection.

The connection establishment request herein may be a PDU session establishment request or a PDN connection establishment request. This is not limited in this application. In a specific implementation, if the connection establishment request is the PDU session establishment request, the established connection is a PDU session; or if the connection establishment request is the PDN connection establishment request, the established connection is a PDN connection.

In a specific implementation, the start time indication information may be any one of the following information: a time point at which the connection is successfully established, a time point at which the first data unit is transmitted through the connection, or a start time of a next charging period.

In a specific implementation, the rate control may be serving PLMN rate control, APN rate control, or DNN rate control.

In a specific implementation, when the rate control is the serving PLMN rate control, a device or an entity corresponding to the control device may be a mobility management network element or a session management network element, and the data sending device may be the terminal or a user plane network element; or the control device may be a mobility management network element, and the data sending device may be a session management network element.

In a specific implementation, when the rate control is the DNN rate control or the APN rate control, the control device may be a user plane network element, and the data sending device may be the terminal; or when the rate control is the serving PLMN rate control, the control device may be a mobility management network element, and the data sending device may be a user plane network element.

In a specific implementation, if the data sending device is the terminal, the time management information further includes timing indication information. The timing indication information is specifically any one of the following information: When the terminal enters a connected mode, timing continues based on a remaining value of the rate control time unit; when the terminal enters a connected mode, timing restarts based on the rate control time unit; or timing starts when the first data unit is transmitted in a next rate control time unit after the rate control time unit expires.

In a specific implementation, if the data sending device is the session management network element or the user plane network element, the time management information further includes timing indication information. The timing indication information is specifically any one of the following information: Timing is continuously performed after the start time of the rate control time unit; or timing starts when the first data unit is transmitted in a next rate control time unit, that is, a next time unit for the rate control, after the rate control time unit expires.

Further, the time management information may further include a rate control value. The rate control value is used to indicate a maximum quantity of data units sent by the data sending device in the rate control time unit. In a specific implementation, the data unit herein may be a message used for sending a data unit, or may be a data unit that is sent, or may be in another form. This is not limited in this application. For example, the data unit may be encapsulated in a NAS message. In this way, a quantity of data units sent by the data sending device is equal to a quantity of NAS messages that are sent and in which the data units are encapsulated.

For example, during the APN rate control or the DNN rate control, the data sending device sends an uplink user data message, where one message includes one data unit (PDU). Therefore, the rate control value herein may be represented by a quantity of PDUs, or by a quantity of NAS messages that include PDUs. For another example, during uplink serving PLMN rate control, the data sending device transmits user data by using a control plane NAS message, where one NAS message includes one data unit (PDU). Therefore, the rate control value herein may be represented by a quantity of PDUs, or by a quantity of NAS messages that include PDUs. For another example, during downlink serving PLMN rate control, the data sending device sends a downlink data PDU. The downlink data PDU is not encapsulated in a NAS message because the downlink data PDU is a PDU. Therefore, the rate control value herein may be represented by a quantity of PDUs.

Optionally, the time management information may further include information about the rate control time unit.

In the system provided in this embodiment, the control device sends the start time indication information of the rate time unit; and after receiving the start time indication information, the data sending device can determine a same time point for starting rate control timing as the control device. In this way, when the data sending device sends a proper quantity of data units to the control device based on the time management information, the control device considers the data as valid data, and does not discard or delay processing the data. This resolves a prior-art problem that a packet is still discarded or delayed being processed when a data sending party sends a proper quantity of data PDUs based on rate control information.

Optionally, the rate control system 100 may be applied to a 4th generation (4G) network, namely, an EPS, a 5G network, and another future network. This is not specifically limited in the embodiments of this application.

Figure 2:
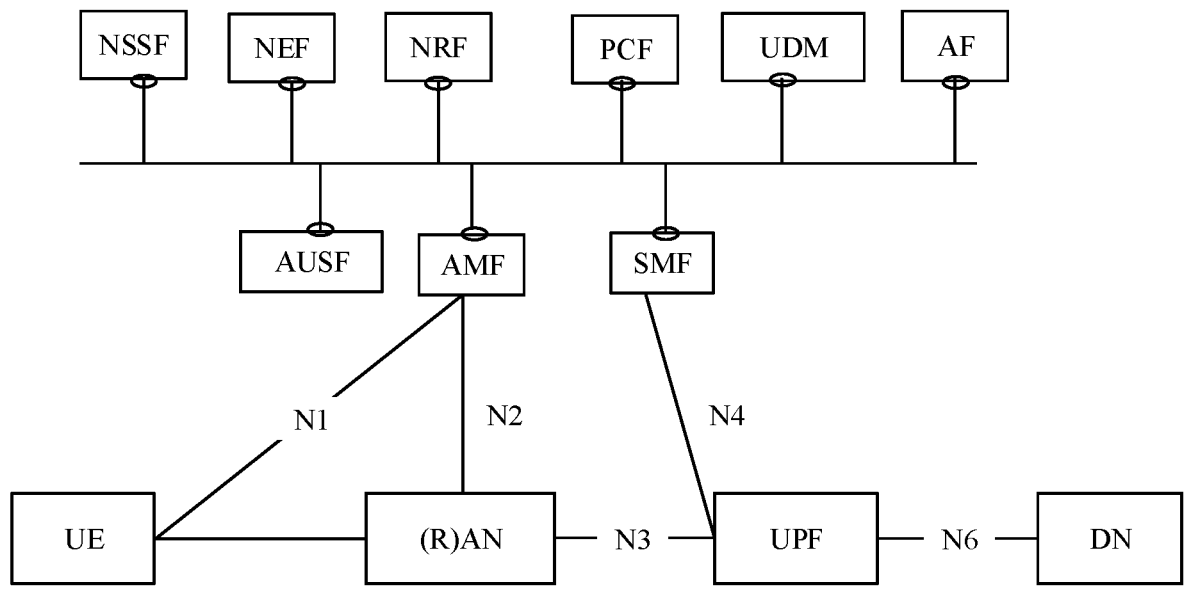
FIG. 2 is a schematic diagram of another possible system network according to an embodiment of this application.

If the rate control system 100 is applied to the 5G network, a diagram 200 of a 5G architecture is shown in FIG. 2. A device or an entity corresponding to the mobility management network element is an access and mobility management function (AMF). A device or an entity corresponding to the session management network element is an SMF. A device or an entity corresponding to the user plane network element is a UPF or an NEF.

The architecture may further include: A core network control plane includes an authentication server function (AUSF), a network slice selection function (NSSF), an NEF, a network function repository function (NF repository function, NRF), a unified data management (UDM), a policy control function (PCF), or an application function (AF).

The AMF may be further responsible for functions such as registration management, mobility management, or lawful interception. This is not specifically limited in the embodiments of this application.

The SMF may be further configured to perform session management, including session-related control functions such as session establishment, session modification, session release, terminal internet protocol (IP) allocation and management, UPF selection and control, or lawful interception.

The UPF may be further configured to forward a user data packet according to a routing rule of the SMF. The AUSF is configured to perform security authentication on the terminal. The NSSF is configured to select a network slice for the terminal. The NEF opens a network function for a third party based on a northbound application programming interface (API). The NRF stores and selects network function entity information for another network element. The UDM is configured to manage a subscription context. The PCF is configured to manage a user policy. The AF is configured to manage a user application.

In the architecture shown in FIG. 2, an N1 interface is a reference point between UE and the AMF and is configured to transfer a NAS message; an N2 interface is a reference point between a (R)AN and the AMF; an N3 interface is a reference point between the (R)AN and the UPF and is configured to transmit user plane data and the like; an N4 interface is a reference point between the SMF and the UPF and is configured to transmit information such as tunnel identifier information of an N3 connection, data buffer indication information, and a downlink data notification message; and an N6 interface is a reference point between the UPF and a DN and is configured to transmit user plane data and the like. Control plane network elements such as the AMF network element, the SMF network element, the AUSF network element, and the UDM network element on a 5G network shown in FIG. 2 may directly or indirectly communicate with each other, for example, may interact with each other through a service based interface. For example, a service based interface externally provided by the AMF network element may be Namf, a service based interface externally provided by the SMF network element may be Nsmf, a service based interface externally provided by the AUSF network element may be Nausf, and a service based interface provided by the UDM network element may be Nudm. For related descriptions, refer to a diagram of a 5G system architecture in the standard TS 23.501. Details are not described herein.

It should be noted that names of the interfaces between the network elements in FIG. 2 are merely examples, and the interfaces may have other names in a specific implementation. This is not specifically limited in the embodiments of this application.

It should be noted that the terminal, the AMF network element, the SMF network element, the UPF network element, the NEF network element, the PCF network element, and the like on the 5G network are merely names, and the names do not constitute any limitation on the devices. On the 5G network and another future network, network elements or entities or devices corresponding to the UE, the AMF, the SMF, the UPF, the NEF, and the PCF may alternatively have other names. This is not specifically limited in the embodiments of this application. For example, the UDM entity may be replaced with a home subscriber server (HSS), a user subscription database (USD), or a database entity. A general description is provided herein, and details are not described below.

Figure 3:
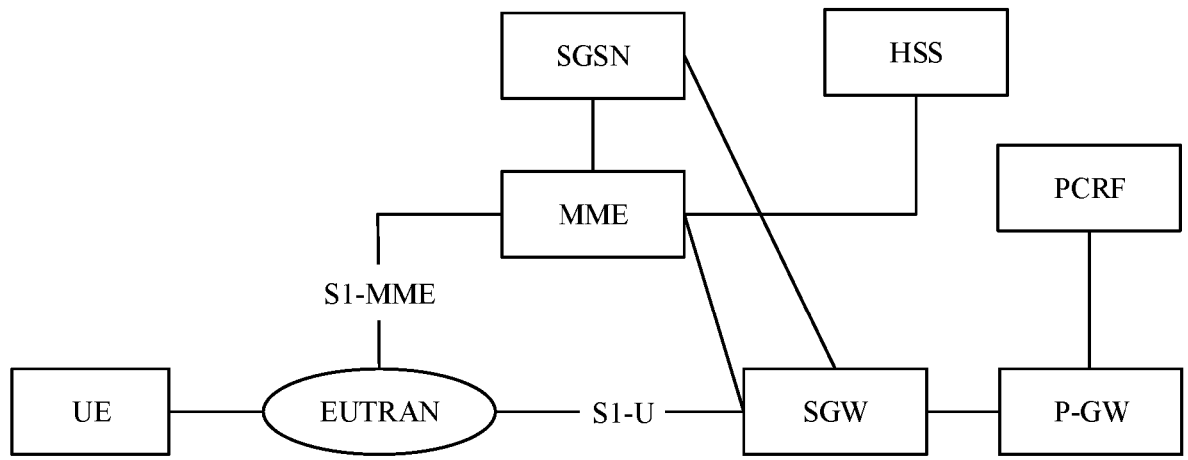
FIG. 3 is a schematic diagram of another possible system network according to an embodiment of this application.

If the rate control system 100 is applied to the 4G network, a diagram 300 of an EPS architecture is shown in FIG. 3. A device or an entity corresponding to the mobility management network element is a mobility management entity (MME). A device or an entity corresponding to the user plane network element is a PGW or a SCEF.

MME: The MME is mainly responsible for control plane functions such as user mobility management and session management, including non-access stratum NAS signaling and security, tracking area list management, selection of a packet data network gateway PGW and a serving network element (serving gateway, SGW), and the like.

PGW: The PGW, serving as an anchor of a PDN connection, is responsible for UE internet protocol (IP) address allocation, UE data packet filtering, rate control, charging information generation, and the like.

In addition, the system may further include the SGW, an evolved universal terrestrial wireless network (E-UTRAN), a serving Ground Penetrating Radar Services (GPRS) support node (SGSN), a home subscriber server (HSS), or a policy and charging rules function (PCRF).

The SGW is mainly responsible for data transmission, data forwarding, route switching, and the like for UE, and serves as a local mobility anchor when the UE is handed over between evolved NodeBs (eNodeB) (only one SGW serves each user equipment at each moment).

The E-UTRAN is a network including a plurality of eNodeBs, and implements functions such as a radio physical layer function, resource scheduling and radio resource management, radio access control, and a mobility management function. The eNodeBs may be connected to each other through an X2 interface, and may transmit data in an X2-based handover process. The eNodeB is connected to the SGW through a user plane interface S1-U, to transmit user data by using a general packet radio system tunneling protocol user plane (general packet radio system general tunneling protocol user plane, GTP-U). The eNodeB is connected to the mobility management entity through a control plane interface S1-MME, to implement functions such as radio access bearer control according to an S1-AP protocol.

The SGSN is an access node on a 2G access network such as a Global System for Mobiles (GSM)/EDGE (Enhanced Data for GSM Evolution) radio access network (GERAN) or a 3G access network such as a universal terrestrial radio access network (UTRAN) and a 3GPP evolved packet core (EPC). The SGSN is responsible for establishing a bearer to the GERAN, the UTRAN, or the EPC and responsible for data forwarding.

The HSS is mainly configured to store subscription data of mobile users. The PCRF is responsible for charging management and policy control, including a policy and charging control (PCC) rule and a quality of service (QoS) rule.

The SCEF (not shown in the figure) provides secure exposure of a service and a capability provided by a 3GPP network interface, and provides a method for discovering the exposed capability and service. The MME can interact with the HSS via the SCEF.

Optionally, the terminal in the embodiments of this application may include a handheld device, vehicle-mounted device, wearable device, and computing device that has a wireless communication function, or another processing device connected to a wireless modem. The terminal device may also be referred to as user equipment (UE), a mobile station (MS), or a terminal device, or may include a subscriber unit, a cellular phone, a smart phone, a wireless data card, a personal digital assistant (PDA) computer, a tablet computer, a wireless modem, a handheld device, a laptop computer, a cordless phone, a wireless local loop (WLL) station, a machine type communication (MTC) terminal, a CIOT terminal, and the like.

Optionally, the control device 10 or the data sending device 20 shown in FIG. 1 may be independent network elements, or may be jointly implemented by a plurality of network elements, or may be used as a functional module in a network element. This is not specifically limited in the embodiments of this application. It may be understood that the foregoing functions may be network elements in a hardware device, or may be software functions running on dedicated hardware, or may be virtual functions instantiated on a platform (for example, a cloud platform).

Figure 4:
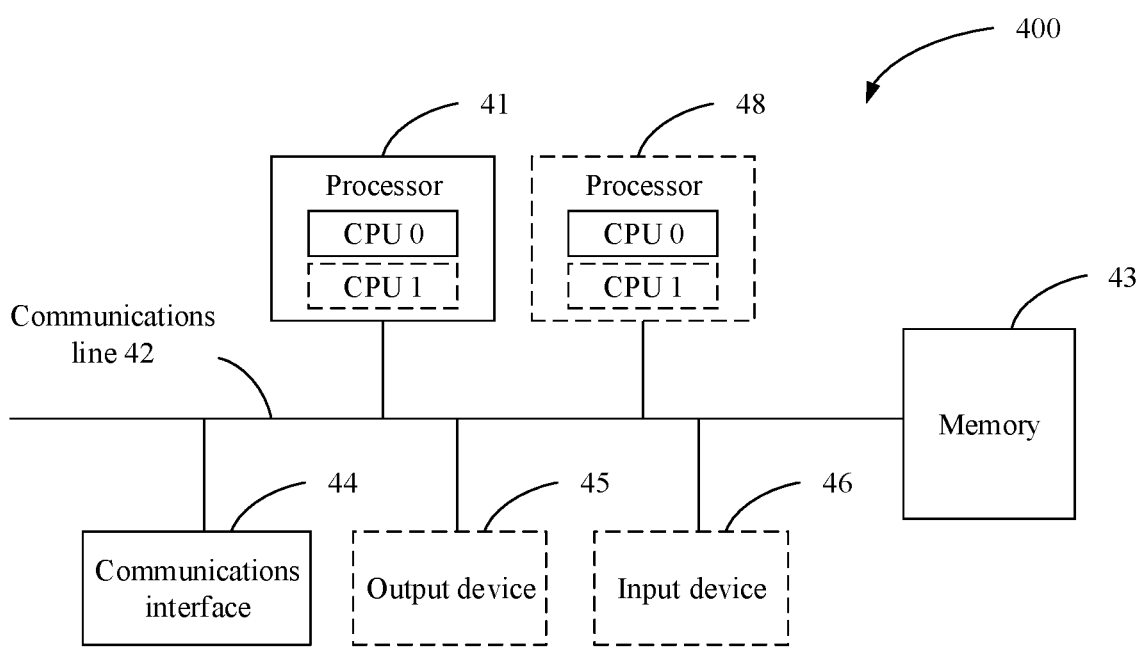
FIG. 4 is a schematic diagram of a computer device according to an embodiment of this application.

As shown in FIG. 4, the control device 10 in FIG. 1, or the AMF, the SMF, and the UE in FIG. 2, or the MME and the UE in FIG. 3 may be implemented by a computer device (or a system) in FIG. 4.

FIG. 4 is a schematic diagram of a computer device according to an embodiment of this application. The computer device 400 includes at least one processor 41, a communications line 42, a memory 43, and at least one communications interface 44.

The processor 41 may be a general-purpose central processing unit (CPU), a microprocessor, an application-specific integrated circuit (ASIC), or one or more integrated circuits configured to control execution of a program in the solutions in this application.

The communications line 42 may include a channel for transmitting information between the foregoing components. The communications interface 44 is configured to communicate with another device or a communications network such as an Ethernet, a radio access network (RAN), or a wireless local area network (WLAN) via any apparatus of a transceiver type.

The memory 43 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another optic disk storage, optical disc storage (including a compact optical disc, a laser disc, an optical disc, a digital general-purpose optical disc, a Blu-ray disc, or the like), or magnetic disk storage medium or another magnetic storage device, or any other media that can be accessed by a computer and that can be configured to carry or store expected program code in an instruction form or in a data structure form, without being limited thereto. The memory may exist independently, and is connected to the processor through the communications line. The memory may be integrated with the processor.

The memory 43 is configured to store application program code used to execute the solutions of this application, where the application program code is executed under control of the processor 41. The processor 41 is configured to execute the application program code stored in the memory 43.

In a specific implementation, in an embodiment, the processor 41 may include one or more CPUs, for example, a CPU 0 and a CPU 1 in FIG. 4.

In a specific implementation, in an embodiment, the computer device 400 may include a plurality of processors, for example, the processor 41 and a processor 48 in FIG. 4. Each of the processors may be a single-core (single-CPU) processor, or may be a multi-core (multi-CPU) processor.

The processor herein may be one or more devices, circuits, and/or processing cores configured to process data (for example, a computer program instruction).

In a specific implementation, in an embodiment, the computer device 400 may further include an output device 45 and an input device 46. The output device 45 communicates with the processor 41, and may display information in a plurality of manners. For example, the output device 45 may be a liquid crystal display (LCD), a light emitting diode (LED) display device, a cathode ray tube (CRT) display device, or a projector. The input device 46 communicates with the processor 41, and may receive user input in a plurality of manners. For example, the input device 46 may be a mouse, a keyboard, a touchscreen device, or a sensing device.

The computer device 400 may be a general-purpose computer device or a dedicated computer device. In a specific implementation, the computer device 400 may be a desktop computer, a portable computer, a network server, a personal digital assistant (PDA), a mobile phone, a tablet computer, a wireless terminal device, a communications device, an embedded device, or a device with a structure similar to a structure in FIG. 4. A type of the computer device 400 is not limited in the embodiments of this application.

For example, the control device 10 in FIG. 1 may be the device shown in FIG. 4. A memory of the control device 10 stores one or more software modules. The control device 10 may implement rate control via the software modules implemented by the processor by using the program code in the memory.

The following describes, with reference to flowcharts, a rate control method provided in the embodiments of this application.

Figure 5:
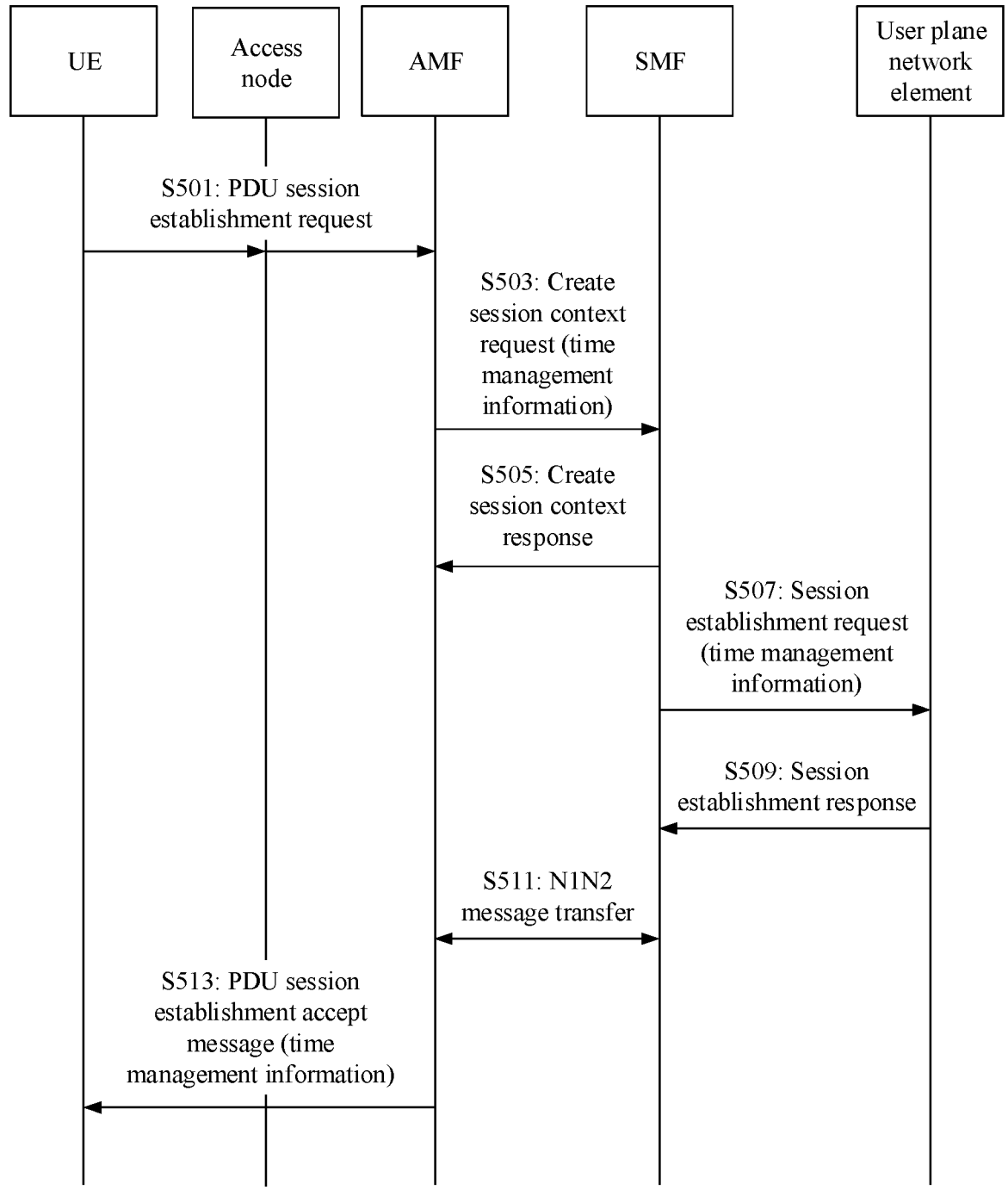
FIG. 5 is a schematic flowchart of a rate selection method according to an embodiment of this application.

FIG. 5 is a schematic flowchart of a rate control method performed in the system shown in FIG. 1 or FIG. 2. FIG. 5 mainly describes a serving PLMN rate control method. This embodiment is described by using an example in which a connection is a session and a connection establishment request is a PDU session establishment request.

S501: UE sends the PDU session establishment request to an AMF via an access node. The AMF receives the PDU session establishment request.

Specifically, after the UE successfully registers with a network, the UE needs to establish a new PDU session according to a request from an upper layer for transmission of uplink and downlink user data. The UE initiates a PDU session establishment procedure to the network side. Specifically, the UE sends a NAS message, for example, an uplink NAS transport (UL NAS transport) message, to the AMF. The NAS message includes a PDU session identifier, a request type, an N1 session management container, and the like. The N1 session management container includes the PDU session establishment request.

S503: The AMF selects an SMF. Then, the AMF sends a create session context request to the selected SMF. The SMF receives the create session context request. The create session context request includes the PDU session establishment request in S501.

For a method for selecting an SMF by the AMF, refer to a method in the prior art. For example, the AMF may select the SMF based on a DNN or single network slice selection assistance information S-NSSAI provided by the UE. Details are not described herein.

In an actual implementation, a control device may be the AMF or the SMF. Herein, first, that the control device is the AMF is used an example for description.

When the AMF expects to control a sending rate of a downlink NAS data PDU, the create session context request includes serving PLMN rate control time management information. Subsequently, after the PDU session is successfully established, a user plane network element performs, based on the serving PLMN rate control time management information, rate control over data sent through the PDU session.

In a specific implementation, the serving PLMN rate control time management information may be transferred by using a specific information element (IE). The information element herein may also be referred to as a cell.

In a specific implementation, as an implementation, the serving PLMN rate control time management information includes start time indication information of a serving PLMN rate control time unit used for performing serving PLMN rate control. The start time indication information is used to indicate a start time of the serving PLMN rate control time unit.

The start time indication information has a plurality of forms. For example, the start time indication information may be: (a) a time point at which the connection is successfully established, (b) a time point at which the first data unit is transmitted through the connection, or (c) a start time of a next charging period. This is not specifically limited in this application. In the case of (b), as the data can be transmitted through the connection, the time point is a time point after the connection is successfully established. In this embodiment, the connection herein is specifically the PDU session.

In a specific implementation, as an implementation, if a data sending device is the SMF or the user plane network element, the time management information may further include timing indication information. The timing indication information is specifically any one of the following information: First, timing is continuously performed after the start time of the rate control time unit; or, second, timing starts when the first data unit is transmitted in a next rate control time unit after the rate control time unit expires.

In a specific implementation, a timing indication may alternatively be selected based on a policy or a configuration of an operator. This is not specifically limited in this application.

In a specific implementation, as an implementation, the serving PLMN rate control time management information may further include the serving PLMN rate control time unit. The time unit may be six minutes, or certainly may be other time. In a specific implementation, the time unit may alternatively be pre-negotiated between the AMF and the user plane network element. In this case, the create session context request message may not carry the time unit.

In a specific implementation, as an implementation, the serving PLMN rate control time management information may further include a serving PLMN rate control value. The serving PLMN rate control value is used to indicate a maximum quantity of data units sent by the user plane network element in the serving PLMN rate control time unit.

S505: The SMF sends a create session context response to the AMF. The AMF receives the create session context response.

S507: The SMF sends a session establishment request to the user plane network element (the user plane network element herein may be a UPF or an NEF), where the session establishment request carries the serving PLMN time management information. The user plane network element receives the session establishment request. Subsequently, after the session is successfully established, the user plane network element performs, based on the serving PLMN time management information, rate control over the data sent through the PDU session.

In a specific implementation, when performing S507, the SMF may further select a UPF, for example, when the request is an "initialization request". For a specific method for selecting a UPF, refer to the prior art. Details are not described herein.

S509: The user plane network element sends a session establishment response to the SMF. The SMF receives the session establishment response.

S511: The SMF invokes an N1N2 message transfer service operation on a mobility management network element to transmit a message to the AMF. The SMF sends, to the AMF by invoking the N1N2 message transfer service, a PDU session establishment accept message that is to be sent to the UE. The PDU session establishment accept message is used as a response message of the PDU session establishment request received in step S503.

S513: The AMF sends, to the UE via the access node, the PDU session establishment accept message received in S511, where the PDU session establishment accept message is used as a response message of the PDU session establishment request in step S501; and the UE receives the PDU session establishment accept message.

Specifically, the AMF sends a NAS message, for example, a downlink NAS transport (DL NAS transport) message, to the UE. The NAS message includes the PDU session establishment accept message sent by the SMF in S511.

In a specific implementation, as an implementation, when the AMF expects to control a sending rate of an uplink NAS data PDU, the time management information in S503 may be further carried in step 513. Details about the time management information are not described in this step. Subsequently, after the PDU session is successfully established, the UE performs, based on the time management information, rate control over the data sent through the PDU session. After S513, the UE may learn that the PDU session is successfully established.

The AMF may select the start time indication information based on a frequency at which UE sends data. For example, for UE that frequently sends data, (a), (b), or (c) described in S503 may be selected as the start time indication information; and for UE that does not frequently send data, (b) or (c) described in S503 may be selected as the start time indication information.

The AMF may alternatively select the start time indication information based on a status of UE. For example, static UE is usually UE in an energy-saving state. For the static UE, (b) described in S503 may be selected as a start time indication.

The AMF may alternatively select the start time indication information based on communication duration of UE. For UE with long communication duration, (b) described in S503 may be selected as a start time indication. The AMF may alternatively select the start time indication information based on whether UE has an external power supply. For UE with an external power supply, (a) or (b) described in the S503 may be selected as a start time indication. Certainly, in a specific implementation, appropriate start time indication information may alternatively be selected based on a policy or a configuration of an operator. This is not specifically limited in this application.

In a specific implementation, as an implementation, if a data sending device is the UE, the time management information may further include timing indication information. The timing indication information is specifically any one of the following information: (a1) When the UE enters a connected mode, timing continues based on a remaining value of the serving PLMN rate control time unit; (b1) when the UE enters a connected mode, timing restarts based on the serving PLMN rate control time unit; or (c1) timing starts when the first data unit is transmitted in a next serving PLMN rate control time unit after the serving PLMN rate control time unit expires.

The AMF may select the timing indication information based on a frequency at which UE sends data. For example, for UE that frequently sends data, (a1) may be selected as a timing indication; and for UE that does not frequently send data, (b1) or (c1) may be selected as a timing indication. The AMF may alternatively select the timing indication information based on a time interval for periodic communication of UE. If a time interval for periodic communication is relatively long, (b1) is selected. Certainly, in a specific implementation, the timing indication may alternatively be selected based on a policy or a configuration of an operator. This is not specifically limited in this application.

It may be understood that, in this embodiment, the figure shows that the AMF controls both the sending rate of the uplink NAS data PDU and the sending rate of the downlink NAS data PDU. However, in a specific implementation, rate control performed by the AMF over the uplink NAS data PDU is independent of rate control performed by the AMF over the downlink NAS data PDU. The AMF may control only the sending rate of the uplink NAS data PDU. In this case, the time management information may not be carried in S503 and S507. Alternatively, the AMF may control only the sending rate of the downlink NAS data PDU. In this case, the time management information may not be carried in S513. When the AMF simultaneously performs the rate control over the uplink NAS data PDU and the rate control over the downlink NAS data PDU, time management information for both the rate control may be the same or different. This is not limited in this application.

In FIG. 5, the user plane network element or the UE is used as the data sending device for description. In an actual implementation, an SMF may also be used as a data sending device. In a solution in which the SMF is used as the data sending device, a method similar to that in FIG. 5 may be used. A difference from FIG. 5 lies in that the SMF obtains the time management information in S503, and performs, based on the time management information after the PDU session is established, rate control over the data sent through the PDU session. Then, if the user plane network element does not need to be used as the data sending device, the time management information may not be carried in S507. If the user plane network element needs to be used as the data sending device, S507 may be the same as that in FIG. 5.

According to the method provided in this embodiment, the AMF sends the start time indication information of the serving PLMN rate control time unit; and after receiving the start time indication information, the user plane network element, the SMF, or the UE can determine a same time point for starting rate control timing as the AMF. In this way, when the user plane network element, the SMF, or the UE sends a proper quantity of NAS data PDUs to the AMF based on rate control information, the AMF considers the data as valid data, and does not discard or delay processing the data. This resolves a prior-art problem that a packet is still discarded or delayed being processed when a data sending party sends a proper quantity of NAS data PDUs based on rate control information.

In FIG. 5, the AMF is used as a rate control device for description. In an actual implementation, an SMF may also replace the AMF and is used as the rate control device. In a solution in which the SMF is used as the rate control device, a method similar to that in FIG. 5 may be used. A difference from FIG. 5 is that the time management information is not carried in S503. In step S507, if the SMF expects to control a downlink data sending rate, the time management information is carried in the session establishment request in S507. In this way, after receiving the time management information, the user plane network element performs, based on the time management information after the PDU session is established, rate control over downlink data sent through the PDU session. If the SMF expects to control an uplink data sending rate, the SMF sends, to the AMF in S511, the PDU session establishment accept message that carries the time management information, and then the AMF sends, to the UE in S513, the PDU session establishment accept message that carries the time management information. Optionally, the SMF may directly send the time management information to the AMF in S511, and directly send the time management information to the UE in S513. In other words, the time management information is not carried in the PDU session establishment accept message (not shown in the figure). In this way, after receiving the time management information, the UE performs, based on the time management information after the PDU session is established, rate control over the uplink data sent through the PDU session.

According to the method provided in this embodiment, the SMF sends the start time indication information of the serving PLMN rate control time unit; and after receiving the start time indication information, the user plane network element or the UE can determine a same time point for starting rate control timing as the SMF. In this way, when the user plane network element or the UE sends a proper amount of data to the SMF based on the time management information, the SMF considers the data as valid data, and does not discard or delay processing the data. This resolves a prior-art problem that a packet is still discarded or delayed being processed when a data sending party sends a proper quantity of NAS data PDUs based on rate control information.

In this embodiment shown in FIG. 5, actions of the AMF, the SMF, the user plane network element, or the terminal may be respectively performed by the AMF, the SMF, the user plane network element, or the terminal based on the foregoing software module in the memory. This is not limited in the embodiments of this application.

Figure 6:
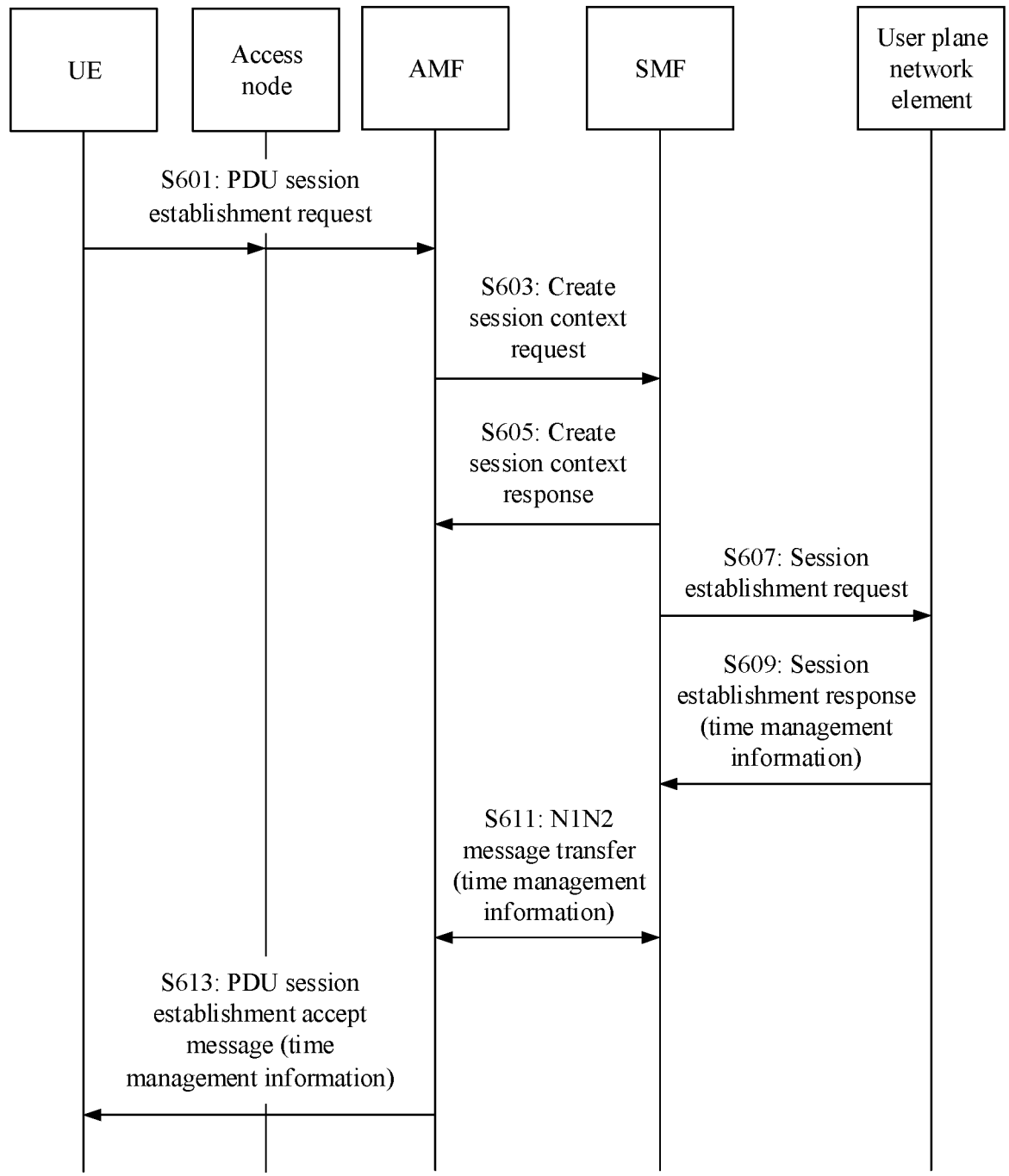
FIG. 6 is a schematic flowchart of another rate selection method according to an embodiment of this application.

FIG. 6 is a schematic flowchart of a rate control method performed in the system shown in FIG. 1 or FIG. 2. FIG. 6 mainly describes a DNN rate control method. This embodiment is described by using an example in which a connection is a session and a connection establishment request is a PDU session establishment request.

S601: S601 is the same as S501.

S603: A main difference between S603 and S503 is that the create session context request does not carry DNN rate control time management information.

S605: S605 is the same as S505.

S607: A main difference between S607 and S507 is that the session establishment request does not carry the DNN rate control time management information.

S609: The user plane network element sends a session establishment response to the SMF. The SMF receives the session establishment response.

If the user plane network element expects to control a DNN uplink data sending rate, where DNN uplink data is sent by the UE and associated with the PDU session, the session establishment response message includes the DNN rate control time management information. Subsequently, after the PDU session is successfully established, the terminal performs, based on the DNN rate control time management information, rate control over data sent through the PDU session.

In a specific implementation, the DNN rate control time management information may be transmitted by using a protocol configuration option (PCO) or an extended protocol configuration option (ePCO).

In a specific implementation, as an implementation, the DNN rate control time management information includes start time indication information of a DNN rate control time unit. The start time indication information is used to indicate a start time of the DNN rate control time unit.

The start time indication information has a plurality of forms. In a specific implementation, three forms (a), (b), and (c) in S503 may also be used. This is not specifically limited in this application.

The user plane network element may select the start time indication information by using the method in S513 in which the AMF selects the start time indication information. For example, the start time indication information is selected based on a frequency at which the UE sends data, a status of the UE, or communication duration of the UE. Details are not described herein again.

In a specific implementation, as an implementation, the DNN rate control time management information may further include a timing indication. The timing indication is specifically any one of the following information: (a1) When the UE enters a connected mode, timing continues based on a remaining value of the DNN rate control time unit; (b1) when the UE enters a connected mode, timing restarts based on the DNN rate control time unit; or (c1) timing starts when the first data unit is transmitted in a next DNN rate control time unit after the DNN rate control time unit expires.

The user plane network element may select the timing indication information by using the method in S513 in which the AMF selects the timing indication information. For example, the timing indication information is selected based on a frequency at which the UE sends data, or a time interval for periodic communication of the UE. Details are not described herein again.

In a specific implementation, as an implementation, the DNN rate control time management information may further include the DNN rate control time unit. The time unit herein is not specifically limited. In a specific implementation, the time unit may alternatively be pre-negotiated between the user plane network element and the terminal. In this case, the session establishment response may not carry the time unit.

In a specific implementation, as an implementation, the DNN rate control time management information may further include a DNN rate control value. The DNN rate control value is used to indicate a maximum quantity of data units sent by the terminal in the DNN rate control time unit.

S611: The SMF invokes an N1N2 message transfer service operation on a mobility management network element to transmit a message to the AMF. The SMF sends, to the AMF by invoking the N1N2 message transfer service, a PDU session establishment accept message that is to be sent to the UE. The PDU session establishment accept message is used as a response message of the PDU session establishment request received in step S603. The SMF adds the time management information in S609 in the PDU session establishment accept message. Optionally, the SMF may add the time management information in S609 in the N1N2 message transfer. In other words, the SMF does not add the time management information in the PDU session establishment accept message (not shown in this figure).

S613: The AMF sends the PDU session establishment accept message to the UE via the access node, where the PDU session establishment accept message is used as a response message of the PDU session establishment request in step S501; and the UE receives the PDU session establishment accept message.

Specifically, the AMF sends a NAS message, for example, a downlink NAS transport (DL NAS transport) message, to the UE. The NAS message includes the PDU session establishment accept message sent by the SMF in S611. If the SMF adds the time management information in S609 in the PDU session establishment accept message, the UE receives the time management information carried in the PDU session establishment accept message. If the SMF transmits the time management information in S609 to the AMF by using the N1N2 message, the UE receives the time management information carried in the NAS message.

According to the method provided in this embodiment, the user plane network element sends the start time indication information of the DNN rate control time unit; and after receiving the start time indication information, the UE can determine a same time point for starting rate control timing as the user plane network element. In this way, when the UE sends a proper amount of data to the user plane network element based on the time management information, the user plane network element considers the data as valid data, and does not discard or delay processing the data. This resolves a prior-art problem that a packet is still discarded or delayed being processed when a data sending party sends a proper amount of data based on rate control information.

In this embodiment shown in FIG. 6, actions of the user plane network element or the terminal may be respectively performed by the user plane network element or the terminal based on the foregoing software module in the memory. This is not limited in the embodiments of this application.

Figure 7:
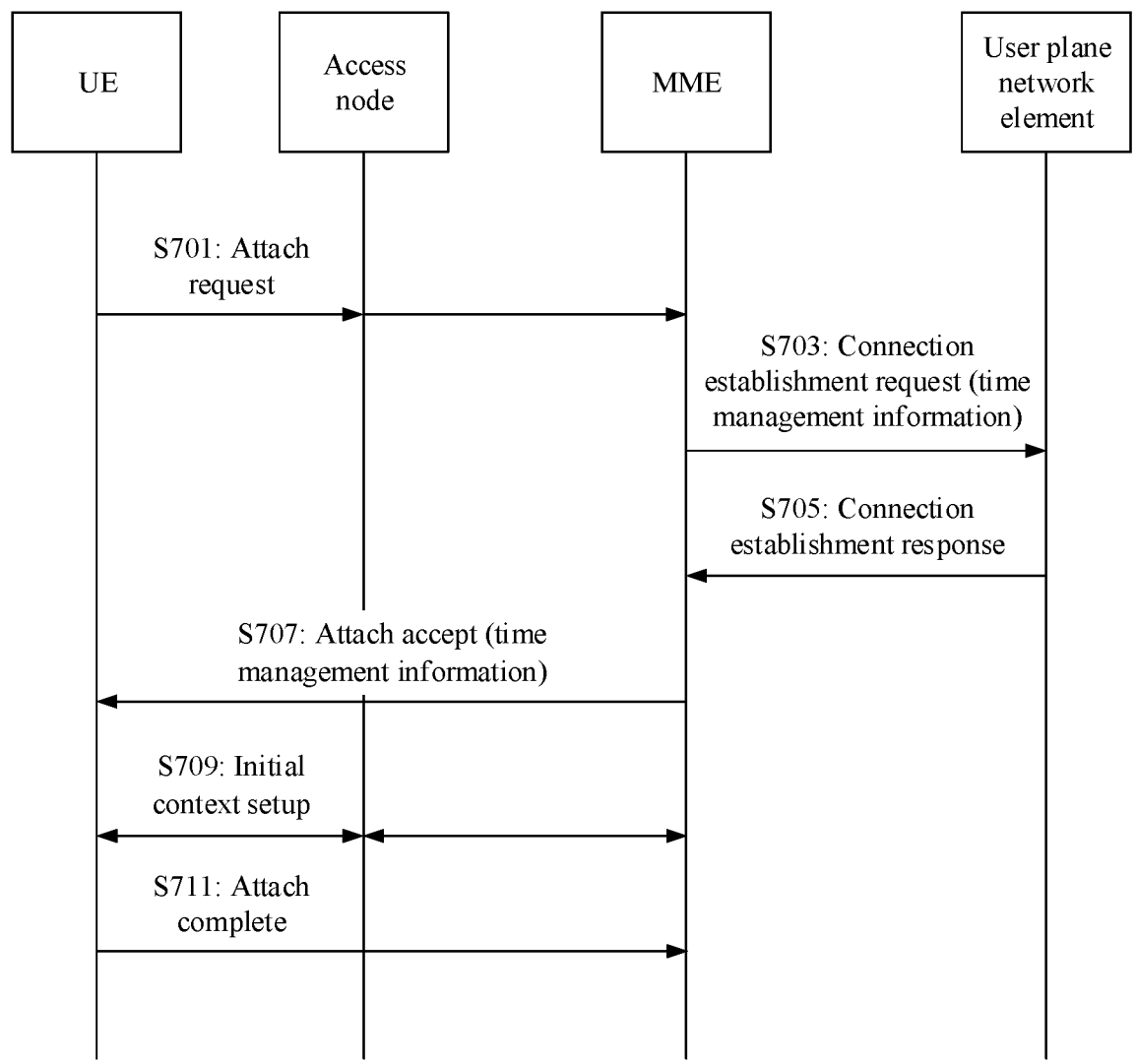
FIG. 7 is a schematic flowchart of another rate selection method according to an embodiment of this application.

FIG. 7 is a schematic flowchart of a rate control method performed in the system shown in FIG. 1 or FIG. 3. FIG. 7 mainly describes a serving PLMN rate control method.

S701: UE sends an attach request to an MME via an access node. The MME receives the attach request.

S703: The MME sends a connection establishment request to a user plane network element. The user plane network element receives the connection establishment request.

If the MME expects to control a sending rate of a downlink NAS data PDU, the connection establishment request message includes serving PLMN rate control time management information. Subsequently, after a connection is successfully established, the user plane network element performs, based on the serving PLMN rate control time management information, rate control over data sent through the connection.

In a specific implementation, the serving PLMN rate control time management information may be transferred by using a specific IE.

In a specific implementation, as an implementation, the serving PLMN rate control time management information includes start time indication information of a serving PLMN rate control time unit. For a form of the start time indication information, refer to related descriptions in S503. Details are not described herein again.

In a specific implementation, as an implementation, the serving PLMN rate control time management information may further include the serving PLMN rate control time unit. For the time unit, refer to related descriptions in S503. Details are not described herein again.

In a specific implementation, as an implementation, the serving PLMN rate control time management information may further include a serving PLMN rate control value. For the rate control value, refer to related descriptions in S503. Details are not described herein again.

S705: The user plane network element sends a connection establishment response message to the MME. The connection establishment response message may be sent to the MME via an SGW.

S707: The MME sends an attach accept message to the UE. The UE receives the attach accept message.

In a specific implementation, as an implementation, if the MME expects to control a sending rate of an uplink NAS data PDU, the attach accept message may further carry the serving PLMN rate control time management information in S703. Details about the serving PLMN rate control time management information are not described in this step. Subsequently, after the connection is successfully established, the terminal performs, based on the serving PLMN rate control time management information, rate control over the data to be sent through the connection.

The MME may select the start time indication information by using the method in S513 in which the AMF selects the start time indication information. Details are not described herein again.

In a specific implementation, as an implementation, if a data sending device is the UE, the serving PLMN rate control time management information may further include a timing indication. The timing indication is specifically any one of the following information: (a1) When the UE enters a connected mode, timing continues based on a remaining value of the serving PLMN rate control time unit; (b1) when the UE enters a connected mode, timing restarts based on the serving PLMN rate control time unit; or (c1) timing starts when the first data unit is transmitted in a next serving PLMN rate control time unit after the serving PLMN rate control time unit expires.

The MME may select the timing indication by using the method used by the AMF for selecting the timing indication in S513. Details are not described herein again.

S709: The MME sends an initial context setup message to the UE to request information such as an access stratum security context. The UE receives the initial context setup message. The initial context setup message may be used to request to reconfigure a radio resource control connection.

S711: After an initial context is set up, the terminal sends an attach complete message to the MME, and the MME receives the attach complete message.

It may be understood that, in this embodiment, the figure shows that the MME controls both the sending rate of the uplink NAS data PDU and the sending rate of the downlink NAS data PDU. However, in a specific implementation, rate control performed by the MME over the uplink NAS data PDU is independent of rate control performed by the MME over the downlink NAS data PDU. The MME may control only the sending rate of the uplink NAS data PDU. In this case, the serving PLMN rate control time management information may not be carried in S703. Alternatively, the MME may control only the sending rate of the downlink NAS data PDU. In this case, the serving PLMN rate control time management information may not be carried in S707. When the MME simultaneously performs the rate control over the uplink NAS data PDU and the rate control over the downlink NAS data PDU, time management information for both the rate control may be the same or different. This is not limited in this application.

According to the method provided in this embodiment, the MME sends the start time indication information of the serving PLMN rate time unit; and after receiving the start time indication information, the user plane network element or the UE can determine a same time point for starting rate control timing as the MME. In this way, when the user plane network element or the UE sends a proper quantity of NAS data PDUs to the MME based on rate control information, the MME considers the data as valid data, and does not discard or delay processing the data. This resolves a prior-art problem that a packet is still discarded or delayed being processed when a data sending party sends a proper quantity of NAS data PDUs based on rate control information.

In an actual implementation, as an implementation, the embodiment shown in FIG. 7 may be applied to a scenario in which a PDN connection is established. Main differences between an execution procedure and that in FIG. 7 are as follows: In step S701, the terminal sends a PDN connection establishment request instead of the attach request; in S709, a bearer establishment message is sent; and in S711, a connection complete message is sent. Other steps are similar to those shown in FIG. 7. Details are not described herein again.

In this embodiment shown in FIG. 7, actions of the MME, the user plane network element, or the terminal may be respectively performed by the MME, the user plane network element, or the terminal based on the foregoing software module in the memory. This is not limited in the embodiments of this application.

Figure 8:
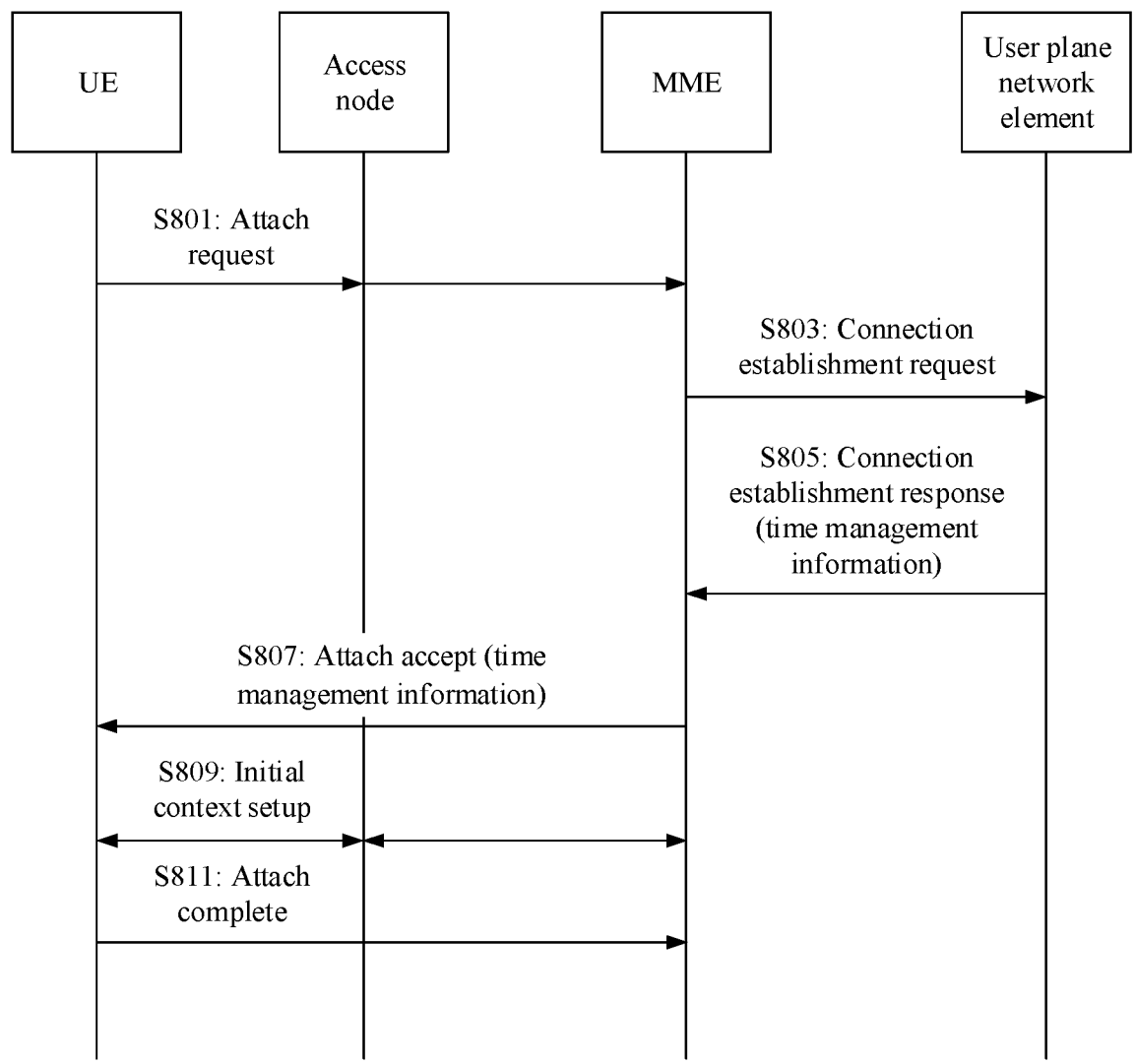
FIG. 8 is a schematic flowchart of another rate selection method according to an embodiment of this application.

FIG. 8 is a schematic flowchart of a rate control method performed in the system shown in FIG. 1 or FIG. 2. FIG. 8 mainly describes an APN rate control method.

S801: S801 is the same as S701.

S803: A main difference between S803 and S703 is that a connection establishment request message does not carry rate control time management information.

S805: The user plane network element sends a connection establishment response message to the MME. The connection establishment response message may be sent to the MME via an SGW.

When the user plane network element expects to control a sending rate of an uplink NAS data PDU, the connection establishment request message includes APN rate control time management information. Subsequently, after a connection is successfully established, the terminal performs, based on the APN rate control time management information, rate control over data to be sent through the connection.

In a specific implementation, the APN rate control time management information may be transferred by using a PCO/an ePCO.

In a specific implementation, as an implementation, the APN rate control time management information includes start time indication information of an APN rate control time unit, and the start time indication information is used to indicate a start time of the APN rate control time unit used for APN rate control.

The start time indication information has a plurality of forms. In a specific implementation, the three forms (a), (b), and (c) in S703 may also be used. This is not specifically limited in this application.

The user plane network element may select the start time indication information by using the method in S513 in which the AMF selects the start time indication information. For example, the start time indication information is selected based on a frequency at which the UE sends data, a status of the UE, or communication duration of the UE. Details are not described herein again.

In a specific implementation, as an implementation, the APN rate control time management information may further include the serving APN rate control time unit. A specific value of the time unit is not limited in this application. In a specific implementation, the time unit may alternatively be pre-negotiated between the user plane network element and the terminal. In this case, the connection establishment request response may not carry the time unit.

In a specific implementation, as an implementation, the APN rate control time management information may further include an APN rate control value. The APN rate control value is used to indicate a maximum quantity of data units sent by the terminal in the APN rate control time unit.

In a specific implementation, as an implementation, the APN rate control time management information may further include timing indication information. The timing indication information is specifically any one of the following information: (a1) When the UE enters a connected mode, timing continues based on a remaining value of the APN rate control time unit; (b1) when the UE enters a connected mode, timing restarts based on the APN rate control time unit; or (c1) timing restarts when the first NAS data packet data unit that carries data is transmitted in a next APN rate control time unit after the APN rate control time unit expires.

The user plane network element may select the timing indication information by using the method in S513 in which the AMF selects the timing indication information. For example, the timing indication information is selected based on a frequency at which the UE sends data, or a time interval for periodic communication of the UE. Details are not described herein again.

S807: The MME sends an attach accept message to the UE. The UE receives the attach accept message. The attach accept message carries the APN rate control time management information in S805.

S809 to S811: S809 to S811 are the same as S709 to S711, and details are not described herein again.

According to the method provided in this embodiment, the user plane network element sends the start time indication information of the APN rate time unit; and after receiving the start time indication information, the UE can determine a same time point for starting rate control timing as the user plane network element. In this way, when the UE sends a proper quantity of NAS data PDUs to the user plane network element based on rate control information, the user plane network element considers the data as valid data, and does not discard or delay processing the data. This resolves a prior-art problem that a packet is still discarded or delayed being processed when a data sending party sends a proper quantity of data PDUs based on rate control information.

In an actual implementation, as an implementation, the embodiment shown in FIG. 8 may be applied to a scenario in which a PDN connection is established. Main differences between an execution procedure and that in FIG. 8 are as follows: In step S801, the terminal sends a PDN connection establishment request instead of the attach request; in S809, a bearer establishment message is sent; and in S811, a connection complete message is sent. Other steps are similar to those shown in FIG. 8. Details are not described herein again.

In this embodiment shown in FIG. 8, actions of the user plane network element or the terminal may be respectively performed by the user plane network element or the terminal based on the foregoing software module in the memory. This is not limited in the embodiments of this application.

Figure 9:
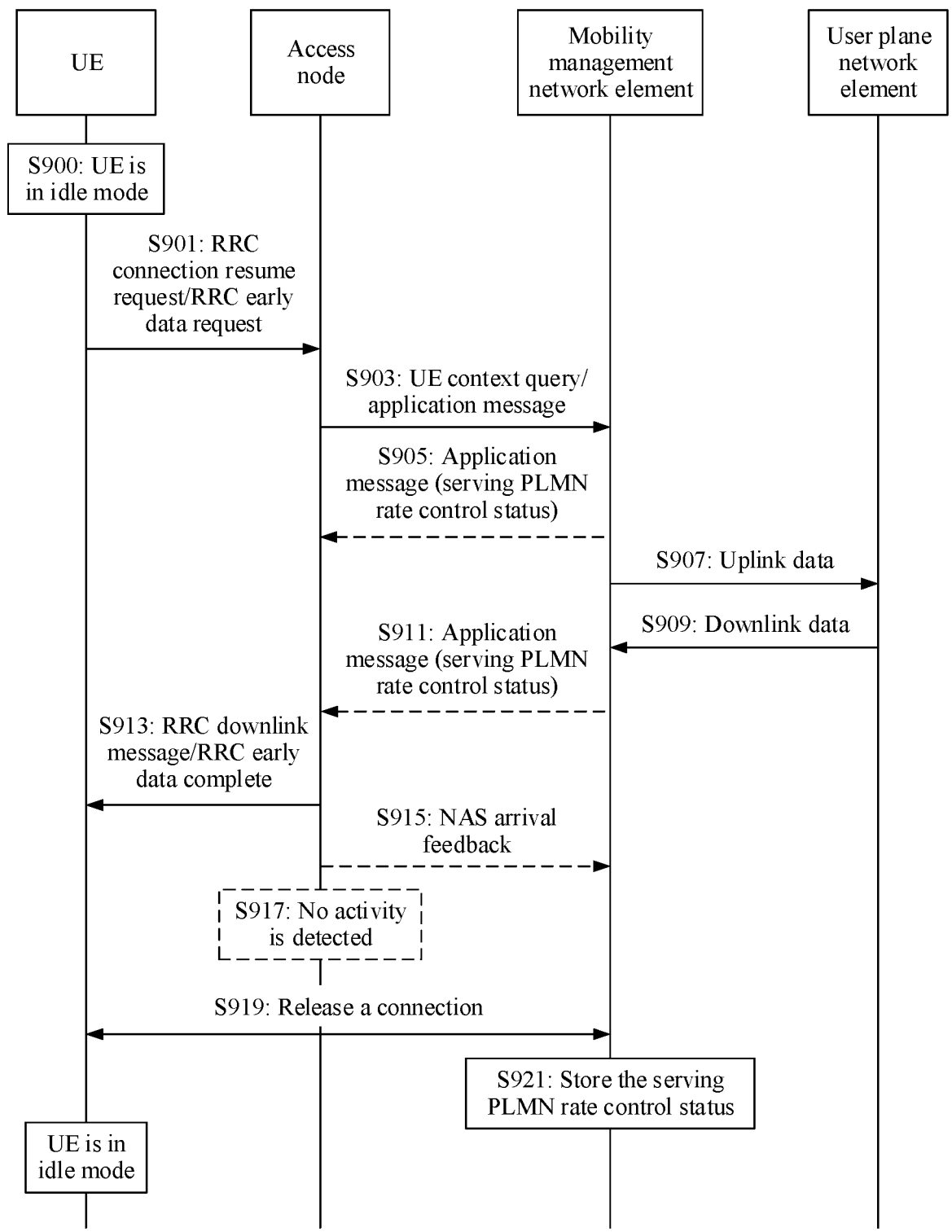
FIG. 9 is a schematic flowchart of another rate selection method according to an embodiment of this application.

FIG. 9 is a schematic flowchart of a rate control method performed in the system shown in FIG. 2. FIG. 9 mainly describes a serving PLMN rate control method.

In a mobile originated (MO) data transmission process, a rate management device sends a serving rate control status to a data sending device. After receiving information about the serving rate control status, the data sending device adjusts a data transmission rate based on the information about the serving rate control status. In FIG. 9, for example, the rate management device is a mobility management network element (corresponding to an AMF in 5G), and the data sending device is UE.

S900: Before MO data is initiated, the UE is in idle mode.

S901: The UE sends a radio resource control (RRC) connection request message or an RRC early data request message to an access node.

Optionally, a NAS PDU that is to be sent further includes a connection identifier or a session identifier and encrypted uplink data.

S903: In an IoT scenario, based on a configuration, if a user equipment context has not been queried previously, the access node may query the UE context from the mobility management network element. The access node forwards the NAS PDU from the UE to the mobility management network element by using an application layer message.

If the RRC early data request message is sent in step 901, the access node includes an "early data transmission (EDT) session" identifier in an application message.

Optionally, after receiving the NAS PDU, the mobility management network element performs data decryption and integrity check on the NAS PDU.

S905: This step is optional. If the mobility management network element receives the "EDT session" identifier, the mobility management network element sends an application message to the access node.

If rate control has been started in a previous connection or session establishment procedure, the mobility management network element may add the serving PLMN rate control status to the application message based on a status of received uplink data and a timing status. After receiving the serving PLMN rate control status, the UE adjusts a sending rate of the uplink data based on the serving PLMN rate control status.

The serving PLMN rate control status includes two parts of information. A first part is a remaining validity period of a current serving PLMN rate control status period. A second part is an amount of uplink data that is still allowed to be sent in the current rate control period. The amount of uplink data may be a quantity of uplink data packets or the like.

Optionally, after S905, if a user plane connection between the mobility management network element and a session management network element (not shown in the figure) is not activated, the mobility management network element, the session management network element, and the user plane network element perform a connection or session modification procedure.

A NAS message in S905 is included in the application message. If there is the serving PLMN rate control status, the serving PLMN rate control status may be included in the NAS message. The NAS message herein may also be referred to as a NAS load.

S907: The mobility management network element forwards the uplink data to the user plane network element.

The uplink data may be forwarded by the session management network element.

S909: If there is downlink data, the user plane network element forwards the data to the mobility management network element.

The downlink data may be buffered in the session management network element. In this case, the data is forwarded from the session management network element to the mobility management network element.

Optionally, after receiving the downlink data, the mobility management network element performs integrity protection and data encryption.

S911: The mobility management network element forwards the downlink data to the access node by using an application message, and the mobility management network element may send a connection establishment indication message in the application message.

If rate control has been started in a previous connection or session establishment procedure, the mobility management network element may add the serving PLMN rate control status to the application message based on a status of received uplink data and a timing status. After receiving the serving PLMN rate control status, the UE adjusts a sending rate of the uplink data based on the serving PLMN rate control status.

The serving PLMN rate control status includes two parts of information. For details, refer to S905.

If the mobility management network element has received release assistance information previously and does not expect to send more mobile terminated (MT) data, the mobility management network element sends a UE context release command to the access node.

S913: The access node forwards the downlink data to the UE by using an RRC downlink message.

If the UE context release command is received in S911, step S917 is not performed subsequently. If early data transmission is used in S901, the access node sends an RRC early data complete message to the UE, where the message includes NAS loads from S905 and S911.

S915: If the mobility management network element requires a NAS arrival feedback, the access node sends a NAS arrival notification to the mobility management network element.

S917: After a period of time, detect whether there is a NAS PDU activity. This step is optional.

S919: Perform a connection release procedure between the UE and the mobility management network element. After this step, the UE enters the idle mode again.

S921: Store the current serving PLMN rate control status, that is, information such as the remaining validity period of the serving PLMN rate control period and the amount of uplink data that can still be sent in the serving PLMN rate control period.

The method shown in FIG. 9 may also be applied to a 4G system. If the method is applied to the 4G system, the mobility management network element is an MME.

According to the method provided in this embodiment, in the MO data transmission process, the rate control device sends the information about the serving PLMN rate control status to the data sending device; and after receiving the information about the serving PLMN rate control status, the data sending device properly adjusts the data sending rate. In this way, the data sending device can adjust the data sending rate in a timely manner, to avoid a possibility that the rate control device discards a packet when the rate exceeds a limit.

Figure 10A:
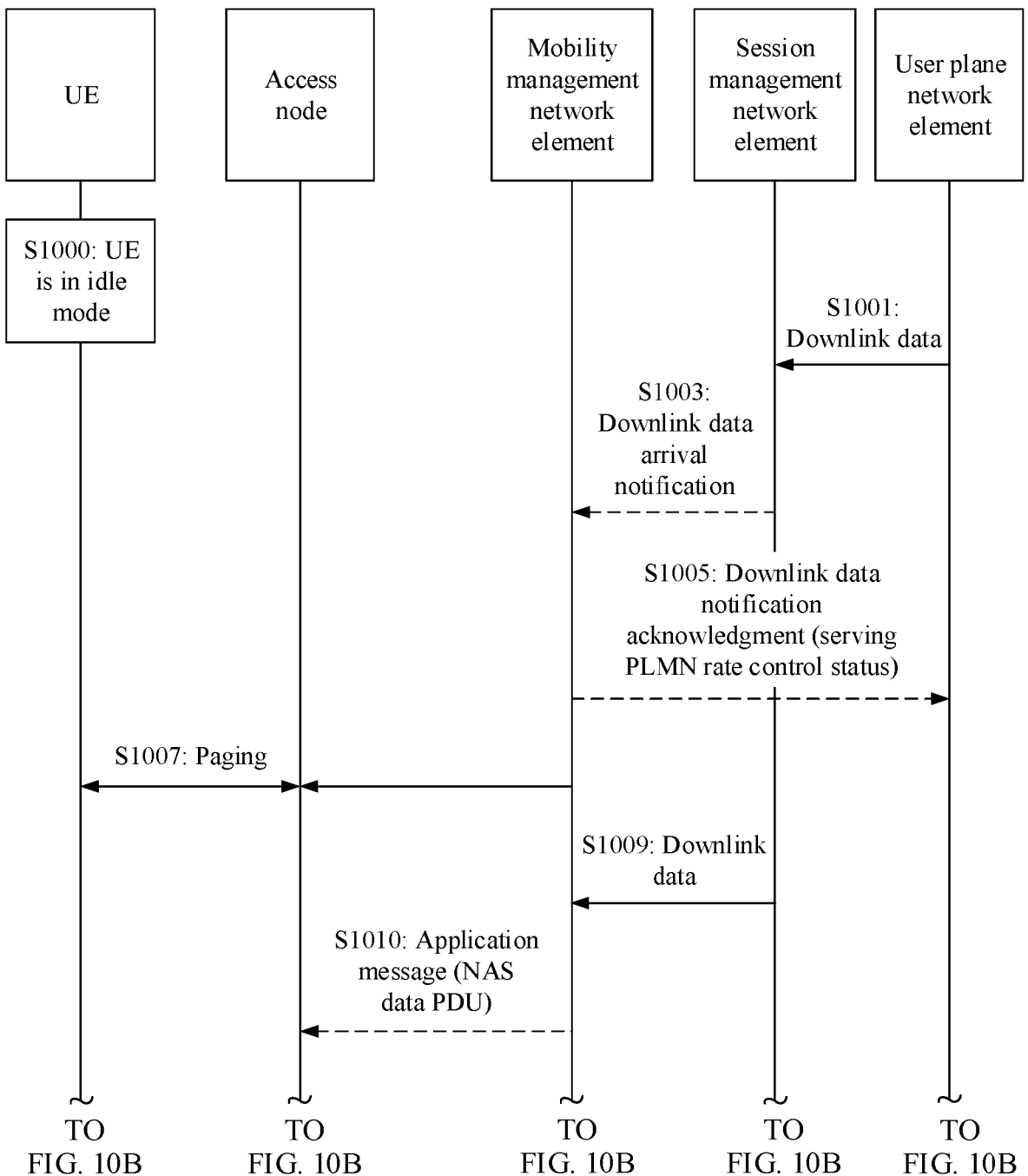
FIG. 10A and FIG. 10B are a schematic flowchart of another rate selection method according to an embodiment of this application.
Figure 10B:
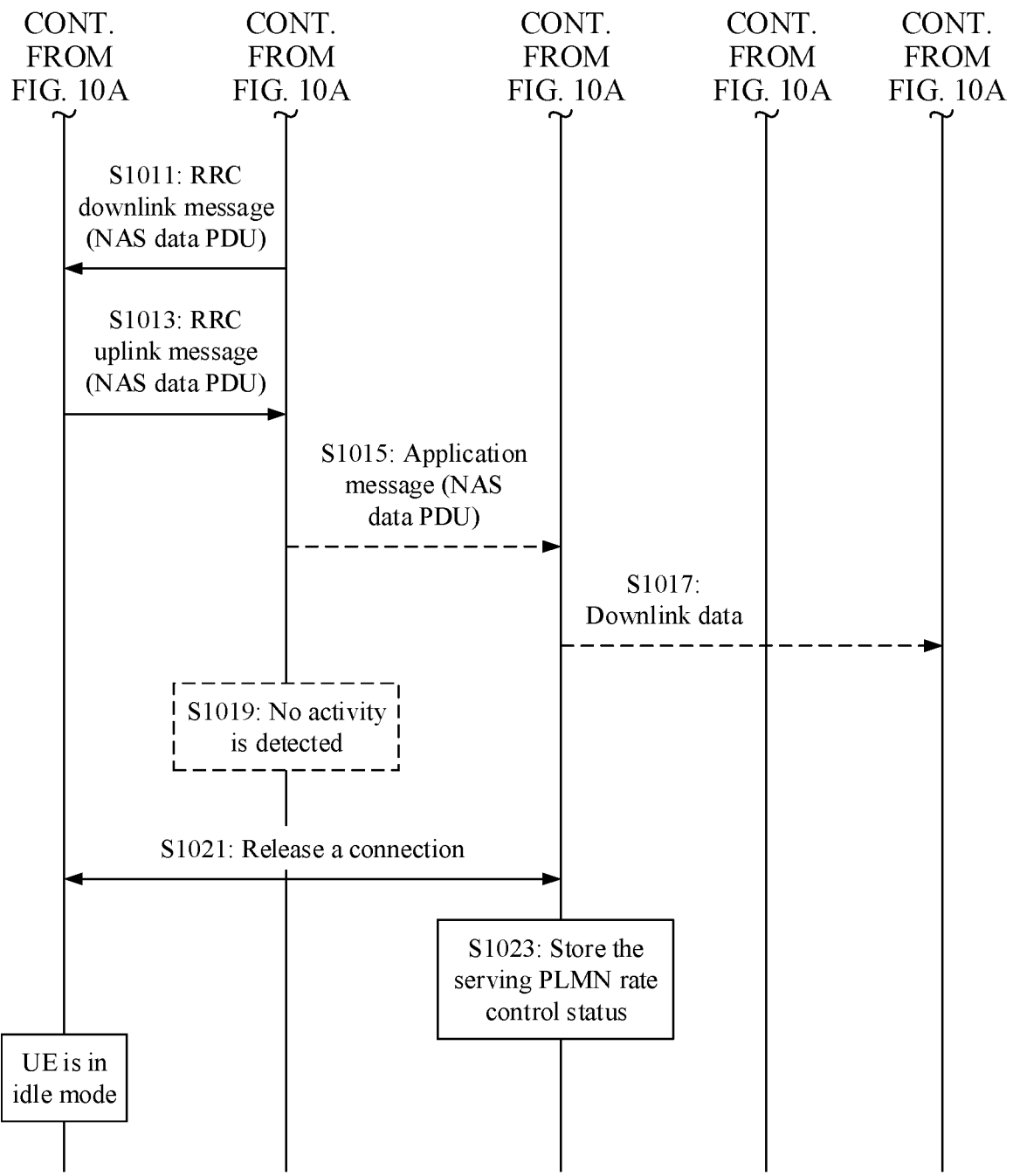

FIG. 10A and FIG. 10B are a schematic flowchart of a rate method performed in the system shown in FIG. 2. FIG. 10A and FIG. 10B mainly describe a serving PLMN rate control method.

In a mobile terminated (MT) data transmission process, a rate management device sends a serving rate control status to a data sending device. After receiving information about the serving rate control status, the data sending device adjusts a data transmission rate based on the information about the serving rate control status. In FIG. 10A and FIG. 10B, for example, the rate management device is a mobility management network element, and the data sending device is a user plane network element.

S1000: Before MO data is initiated, UE is in idle mode.

S1001: After receiving downlink data, the user plane network element sends the downlink data to a session management network element.

Optionally, the session management network element buffers the downlink data.

S1003: After receiving the downlink data, the session management network element sends a downlink data arrival notification to the mobility management network element.

S1005: After receiving the downlink data arrival notification, the mobility management network element may send a downlink data arrival notification acknowledgment message to the user plane network element based on a status, a configuration, or the like of the UE.

The downlink data arrival notification acknowledgment message may include information such as a time length required by the session management network element to buffer the data. In addition, the mobility management network element adds the serving PLMN rate control status in the acknowledgment message based on a status of received downlink data and a rate control timing status.

The serving PLMN rate control status includes two parts of information. A first part is a remaining validity period of a current serving PLMN rate control status period. A second part is an amount of downlink data that is still allowed to be sent in the current rate control period. The amount of uplink data may be a quantity of uplink data packets, or the like. After receiving the serving PLMN rate control status, the user plane network element adjusts a sending rate of the downlink data based on the serving PLMN rate control status.

S1007: When determining that the UE is reachable, the mobility management network element sends paging information to an access node. The access node pages the UE based on information provided by the mobility management network element, and establishes an RRC connection.

Optionally, if a user plane connection between the mobility management network element and the session management network element is not activated, the mobility management network element, the session management network element, and the user plane network element perform a connection or session modification procedure.

S1009: The session management network element sends the buffered downlink data to the mobility management network element.

Optionally, after receiving the downlink data, the mobility management network element performs integrity protection and data encryption.

S1010: The mobility management network element forwards the downlink data to the access node by using an application message.

S1011: The access node forwards the downlink data to the UE by using an RRC downlink message.

S1013: If the RRC connection still exists, the UE may send the data by using NAS signaling. A NAS data PDU may be sent to the access node by using an RRC uplink message.

S1015: After receiving uplink data, the access node forwards the uplink data to the mobility management network element by using an application message.

Optionally, after receiving the NAS PDU, the mobility management network element performs data decryption and integrity check on the NAS PDU.

S1017: The mobility management network element forwards the downlink data to the user plane network element via the session management network element.

S1019: After a period of time, the access node detects whether there is a NAS PDU activity.

S1021: Perform a connection release procedure between the UE and the mobility management network element. After this step, the UE enters the idle mode again.

S1023: Store the current serving PLMN rate control status, that is, information such as the remaining validity period of the serving PLMN rate control period and an amount of uplink data that can still be sent in the serving PLMN rate control period.

The method shown in FIG. 10A and FIG. 10B may also be applied to a 4G system. If the method is applied to the 4G system, the mobility management network element is an MME.

According to the method provided in this embodiment, in the MT data transmission process, the rate control device sends the information about the serving PLMN rate control status to the data sending device; and after receiving the information about the serving PLMN rate control status, the data sending device properly adjusts the data sending rate. In this way, the data sending device can adjust the data sending rate in a timely manner, to avoid a possibility that the rate control device discards a packet when the rate exceeds a limit.

The foregoing mainly describes, from a perspective of interaction between the network elements, the solutions provided in the embodiments of this application. It may be understood that, to implement the foregoing functions, the control device (or the apparatus) or the data sending device (or the apparatus) for implementing rate control includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the control device or the data sending device may be divided into functional modules of based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is merely an example and logical function division, and may be other division in an actual implementation.

Figure 11:
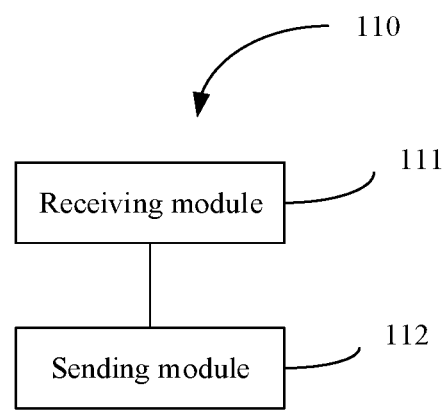
FIG. 11 is a schematic structural diagram of an apparatus according to an embodiment of this application.

For example, when the functional modules are obtained through integration, FIG. 11 is a schematic structural diagram of a rate control apparatus 110. The rate control apparatus 110 may be a mobility management network element, a session management network element, a user plane network element, or a terminal, or may be a chip in these network elements or the terminal. This is not specifically limited in the embodiments of this application. The rate control apparatus 110 includes a receiving module 111 and a sending module 112. The receiving module 111 is configured to receive a connection establishment request from a terminal, where the connection establishment request is used to establish a connection for the terminal to transmit data. The sending module 112 is configured to send rate control time management information to a data sending device, where the time management information is used by the data sending device to perform rate control over the data sent through the connection, the time management information includes start time indication information of a rate control time unit used for rate control, and the start time indication information is used to indicate a start time of the rate control time unit.

Optionally, the start time indication information is specifically any one of the following information: a time point at which the connection is successfully established, a time point at which the first data unit is transmitted through the connection, or a start time of a next charging period.

Optionally, if a data sending apparatus is the terminal or a chip in the terminal, the time management information further includes timing indication information. The timing indication information is specifically any one of the following information: When the terminal enters a connected mode, timing continues based on a remaining value of the rate control time unit; when the terminal enters a connected mode, timing restarts based on the rate control time unit; or timing starts when the first data unit is transmitted in a next rate control time unit after the rate control time unit expires.

Optionally, if the data sending apparatus is the session management network element or the user plane network element, the time management information further includes timing indication information. The timing indication information is specifically any one of the following information: Timing is continuously performed after the start time of the rate control time unit; or timing starts when the first data unit is transmitted in a next rate control time unit after the rate control time unit expires.

All related content of the steps in the foregoing method embodiments may be cited in function descriptions of corresponding functional modules. Details are not described herein again.

In this embodiment, the apparatus 110 is presented in a form of functional modules obtained through integration. The "module" herein may be an application-specific integrated circuit (ASIC), a circuit, a processor and a memory for executing one or more software or firmware programs, an integrated logic circuit, and/or another device that can provide the foregoing functions.

In a simple embodiment, a person skilled in the art may figure out that the rate control apparatus 110 may be in a form shown in FIG. 4.

For example, the processor 41 in FIG. 4 may invoke a computer-executable instruction stored in the memory 43, to enable the apparatus 110 to perform the rate control method in the foregoing method embodiments.

Specifically, functions/implementation processes of the receiving module 111 and the sending module 112 in FIG. 11 may be implemented by the processor 41 in FIG. 4 by invoking the computer-executable instruction stored in the memory 43. Alternatively, functions/implementation processes of the receiving module 111 and the sending module 112 in FIG. 11 may be implemented by the communications interface 44 in FIG. 4.

Optionally, when the apparatus 110 is a chip, the functions/implementation processes of the receiving module 111 and the sending module 112 may alternatively be implemented by a pin, a circuit, or the like. Optionally, when the apparatus 110 is a chip, the memory may be a storage unit in the chip, for example, a register or a cache. Certainly, when the apparatus 110 is the chip, the storage unit may alternatively be a storage unit located outside the chip, for example, the memory 43 shown in FIG. 4.

Figure 12:
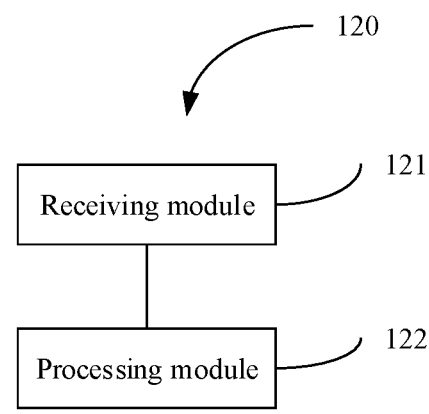
FIG. 12 is a schematic structural diagram of another apparatus according to an embodiment of this application.

For example, when the functional modules are obtained through integration, FIG. 12 is a schematic structural diagram of a data sending apparatus 120. The data sending apparatus 120 may be a user plane network element, a session management network element, or a terminal, or may be a chip in the user plane network element, the session management network element, or the terminal. This is not specifically limited in the embodiments of this application. The data sending apparatus 120 includes a receiving module 121 and a processing module 122. The receiving module 121 is configured to receive rate control time management information, where the time management information includes start time indication information of a rate control time unit used for rate control on a connection through which the terminal transmits data, and the start time indication information is used to indicate a start time of the rate control time unit. The processing module 122 is configured to perform, based on the rate time management information, rate control over the data sent through the connection.

Optionally, the start time indication information may be specifically the same as the start time indication information in FIG. 11. Details are not described herein again.

Optionally, if the data sending apparatus is the terminal or a chip in the terminal, the time management information may specifically include the timing indication information in FIG. 11. Details are not described herein again.

Optionally, if the data sending apparatus is the session management network element or the user plane network element, the time management information may specifically include the timing indication information in FIG. 11. Details are not described herein again.

The apparatus provided in this embodiment of this application may be configured to perform the foregoing rate control method. Therefore, for a technical effect that can be achieved by the apparatus, refer to the foregoing method embodiments. Details are not described herein.

Optionally, an embodiment of this application further provides an apparatus (for example, the apparatus may be a chip system). The apparatus includes a processor, configured to support the control apparatus or the data sending apparatus to implement the foregoing rate control method. In a possible design, the control apparatus or the data sending apparatus further includes memory. The memory is configured to store a program instruction and data that are necessary for the control apparatus or the data sending apparatus. Certainly, the memory may alternatively be not located in the apparatus. When the apparatus is a chip system, the apparatus may include a chip, or may include a chip and another discrete device. This is not specifically limited in the embodiments of this application.

All or some of the foregoing embodiments may be implemented by using software, hardware, firmware, or any combination thereof. When a software program is used to implement the embodiments, the embodiments may be implemented all or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the spirit and scope of this application. Correspondingly, the specification and accompanying drawings are merely example descriptions of this application defined by the accompanying claims, and are considered as any of or all modifications, variations, combinations or equivalents that cover the scope of this application. Definitely, a person skilled in the art can make various modifications and variations to this application without departing from the spirit and scope of this application. This application is intended to cover these modifications and variations of this application provided that the modifications and variations of this application fall within the scope of protection defined by the following claims and their equivalent technologies.

What is claimed is:

1. A rate control method, comprising:
receiving, by a control device, a connection establishment request from a terminal, wherein a connection for the terminal to transmit data is established based on the connection establishment request;
sending, by the control device, rate control time management information to a data sending device for performing rate control over the data sent through the connection based on the rate control time management information, wherein the rate control time management information comprises start time indication information of a rate control time unit used for rate control, and the start time indication information indicates a start time of the rate control time unit for both the data sending device and the control device to start rate control for a predetermined time period; and in response to determining that a plurality of data units is sent based on the rate control time management information from the data sending device and without discarding or delaying the plurality of data units, determining, by the control device, the plurality of data units as valid data.

2. The rate control method according to claim 1, wherein the start time indication information comprises one of:
a time point at which the connection is successfully established,
a time point at which a first data unit is transmitted through the connection, or
a start time of a next charging period.

3. The rate control method according to claim 1, wherein, if the rate control is serving public land mobile network rate control, the control device is one of a mobility management network element or a session management network element, and the data sending device is the terminal.

4. The rate control method according to claim 1, wherein, if the rate control is serving public land mobile network rate control,
the control device is one of a mobility management network element or a session management network element, and the data sending device is a user plane network element; or
the control device is a mobility management network element, and the data sending device is a session management network element.

5. The rate control method according to claim 1, wherein, if the rate control is data network name rate control, the control device is a user plane network element, and the data sending device is the terminal.

6. The rate control method according to claim 1, wherein, if the rate control is access point name rate control, the control device is a user plane network element, and the data sending device is the terminal.

7. The rate control method according to claim 1, wherein, if the data sending device is the terminal, the rate control time management information further comprises timing indication information, and
wherein the timing indication information indicates one of:
when the terminal enters a connected mode, timing continues based on a remaining value of the rate control time unit;
when the terminal enters a connected mode, timing restarts based on the rate control time unit; or
timing starts when a first data unit is transmitted in a next rate control time unit after the rate control time unit expires.

8. The rate control method according to claim 1, wherein, if the data sending device is a session management network element or a user plane network element, the rate control time management information further comprises timing indication information, and
wherein the timing indication information indicates one of:
timing is continuously performed after the start time of the rate control time unit; or
timing starts when a first data unit is transmitted in a next rate control time unit after the rate control time unit expires.

9. The rate control method according to claim 1, wherein the rate control time management information further comprises a rate control value, and the rate control value indicates a maximum quantity of data units sent by the data sending device in the rate control time unit.

10. The rate control method according to claim 1, wherein the rate control time management information further comprises information about the rate control time unit.

11. A rate control method, comprising:
receiving, by a data sending device, rate control time management information from a control device, wherein the rate control time management information comprises start time indication information of a rate control time unit used for rate control on a connection through which a terminal transmits data, and the start time indication information indicates a start time of the rate control time unit for both the data sending device and the control device to start rate control for a predetermined time period; and
performing, by the data sending device based on the rate control time management information, rate control over the data sent through the connection, wherein a plurality of data units sent based on the rate control time management information by the data sending device are processed by the control device without being discarded or delayed.

12. The rate control method according to claim 11, wherein the start time indication information comprises one of:
a time point at which the connection is successfully established,
a time point at which a first data unit is transmitted through the connection, or
a start time of a next charging period.

13. The rate control method according to claim 11, wherein, if the data sending device is the terminal, the rate control time management information further comprises timing indication information, and
wherein the timing indication information indicates one of:
when the terminal enters a connected mode, timing continues based on a remaining value of the rate control time unit;
when the terminal enters a connected mode, timing restarts based on the rate control time unit; or
timing starts when a first data unit is transmitted in a next rate control time unit after the rate control time unit expires.

14. The rate control method according to claim 11, wherein, if the data sending device is a session management network element or a user plane network element, the rate control time management information further comprises timing indication information, and
wherein the timing indication information indicates one of:
timing is continuously performed after the start time of the rate control time unit; or
timing starts when a first data unit is transmitted in a next rate control time unit after the rate control time unit expires.

15. A rate control apparatus, comprising:
at least one processor; and
one or more memories coupled to the at least one processor and storing programming instructions for execution by the at least one processor, the programming instructions instructing the at least one processor to:
- receive a connection establishment request from a terminal, wherein a connection for the terminal to transmit data is established based on the connection establishment request;
- send rate control time management information to a data sending device for performing rate control over the data sent through the connection based on the rate control time management information, wherein the rate control time management information comprises start time indication information of a rate control time unit used for rate control, and the start time indication information indicates a start time of the rate control time unit for both the data sending device and the rate control apparatus to start rate control for a predetermined time period; and
- in response to determining that a plurality of data units is sent based on the rate control time management information from the data sending device and without discarding or delaying the plurality of data units, determine the plurality of data units as valid data.

16. The rate control apparatus according to claim 15, wherein the start time indication information comprises one of:
- a time point at which the connection is successfully established,
- a time point at which a first data unit is transmitted through the connection, or
- a start time of a next charging period.

17. The rate control apparatus according to claim 15, wherein the rate control time management information further comprises timing indication information, and
wherein the timing indication information indicates one of:
- when the terminal enters a connected mode, timing continues based on a remaining value of the rate control time unit;
- when the terminal enters a connected mode, timing restarts based on the rate control time unit; or
- timing starts when a first data unit is transmitted in a next rate control time unit after the rate control time unit expires.

18. The rate control apparatus according to claim 15, wherein the rate control time management information further comprises timing indication information, and
wherein the timing indication information indicates one of:
- timing is continuously performed after the start time of the rate control time unit; or
- timing starts when a first data unit is transmitted in a next rate control time unit after the rate control time unit expires.

19. The rate control apparatus according to claim 15, wherein:
- the rate control is data network name rate control or access point name rate control,
- the rate control apparatus is a user plane network element, and
- the data sending device is the terminal.

20. The rate control apparatus according to claim 15, wherein:
- the rate control is serving public land mobile network rate control,
- the rate control apparatus is one of a mobility management network element or a session management network element, and the data sending device is the terminal or a user plane network element; or
- the rate control apparatus is a mobility management network element, and the data sending device is a session management network element.

* * * * *